US011442702B2

(12) United States Patent
Smith et al.

(10) Patent No.: US 11,442,702 B2
(45) Date of Patent: Sep. 13, 2022

(54) CODE COMPLETION

(71) Applicant: Affirm, Inc., San Francisco, CA (US)

(72) Inventors: Adam Smith, San Francisco, CA (US); Tarak Upadhyaya, San Francisco, CA (US); Juan Lozano, San Francisco, CA (US); Daniel Hung, San Francisco, CA (US)

(73) Assignee: Affirm, Inc., San Francisco, CA (US)

( * ) Notice: Subject to any disclaimer, the term of this patent is extended or adjusted under 35 U.S.C. 154(b) by 0 days.

(21) Appl. No.: 16/579,750

(22) Filed: Sep. 23, 2019

(65) Prior Publication Data

US 2020/0097261 A1   Mar. 26, 2020

Related U.S. Application Data

(60) Provisional application No. 62/735,024, filed on Sep. 22, 2018.

(51) Int. Cl.
*G06F 8/33* (2018.01)
*G06N 3/04* (2006.01)
*G06F 8/34* (2018.01)
*G06F 40/284* (2020.01)

(52) U.S. Cl.
CPC ............ *G06F 8/33* (2013.01); *G06F 8/34* (2013.01); *G06F 40/284* (2020.01); *G06N 3/04* (2013.01)

(58) Field of Classification Search
CPC   G06F 8/33; G06F 8/34; G06F 40/284; G06N 3/04
See application file for complete search history.

(56) References Cited

U.S. PATENT DOCUMENTS

| 6,305,008 B1 * | 10/2001 | Vaidyanathan | G06F 8/33 717/111 |
| 7,191,405 B1 | 3/2007 | Jaramillo | |
| 7,631,294 B2 * | 12/2009 | Rush | G06F 8/70 717/111 |
| 7,865,870 B2 * | 1/2011 | Gunturi | G06F 8/33 717/106 |
| 8,392,880 B2 * | 3/2013 | Ahadian | G06F 8/34 717/115 |
| 8,843,890 B2 * | 9/2014 | Frenkiel | G06F 8/447 717/120 |

(Continued)

OTHER PUBLICATIONS

International Search Report and Written Opinion in PCT International Application No. PCT/US2019/052506, dated Nov. 20, 2019.

(Continued)

*Primary Examiner* — Douglas M Slachta
(74) *Attorney, Agent, or Firm* — Burr & Forman LLP

(57) ABSTRACT

A system and method may provide assistance to programmers during programming to reduce the number of routine tasks that must be performed. In some aspects, the system may suggest one or more code snippets that comprise code completions. The code snippets may be single or multi-token. In some aspects, the system may provide predictive editing or predictive navigation, where the system may predict edits or navigation actions based on a programmer's actions. In some aspects, the system is based on machine learning methods and is trained on past actions of programmers in a code editor.

38 Claims, 17 Drawing Sheets

(56) References Cited

U.S. PATENT DOCUMENTS

| | | | |
|---|---|---|---|
| 9,043,753 B2* | 5/2015 | Fox | G06F 8/36 |
| | | | 717/120 |
| 9,383,973 B2* | 7/2016 | Villar | G06F 16/9535 |
| 9,619,211 B2* | 4/2017 | McCollum | G06F 8/33 |
| 9,952,837 B1* | 4/2018 | Maclay | G06F 8/35 |
| 10,048,945 B1* | 8/2018 | Makkar | G06F 8/36 |
| 10,235,141 B2* | 3/2019 | Chacko | G06F 8/36 |
| 10,534,585 B1* | 1/2020 | Eberlein | G06F 17/18 |
| 10,628,286 B1* | 4/2020 | Iyer | G06F 8/33 |
| 11,029,926 B2* | 6/2021 | Bodin | G06F 3/1454 |
| 2001/0034879 A1* | 10/2001 | Washington | G06F 8/34 |
| | | | 717/100 |
| 2001/0035879 A1* | 11/2001 | Washington | G06F 8/34 |
| | | | 715/763 |
| 2004/0003335 A1* | 1/2004 | Gertz | H03M 13/47 |
| | | | 714/758 |
| 2004/0031017 A1* | 2/2004 | Vaidyanathan | G06F 8/33 |
| | | | 717/110 |
| 2005/0229154 A1* | 10/2005 | Hiew | G06F 8/34 |
| | | | 717/110 |
| 2006/0026559 A1* | 2/2006 | Gunturi | G06F 8/315 |
| | | | 717/110 |
| 2006/0150150 A1* | 7/2006 | Tiwari | G06F 8/33 |
| | | | 717/110 |
| 2008/0005235 A1* | 1/2008 | Hegde | G06Q 10/10 |
| | | | 709/204 |
| 2008/0320438 A1* | 12/2008 | Funto | G06F 8/33 |
| | | | 717/106 |
| 2009/0254880 A1* | 10/2009 | Gryko | G06F 8/33 |
| | | | 717/109 |
| 2009/0313597 A1 | 12/2009 | Rathbone et al. | |
| 2011/0314446 A1* | 12/2011 | Esbensen | G06F 40/166 |
| | | | 717/110 |
| 2012/0174061 A1* | 7/2012 | McCollum | G06F 8/33 |
| | | | 717/106 |
| 2014/0040741 A1* | 2/2014 | van Os | G06F 3/0484 |
| | | | 715/719 |
| 2014/0109042 A1* | 4/2014 | Christensen | G06F 8/36 |
| | | | 717/109 |
| 2014/0359572 A1* | 12/2014 | Yuen | G06F 8/33 |
| | | | 717/111 |
| 2014/0359574 A1* | 12/2014 | Beckwith | G06F 3/0482 |
| | | | 717/113 |
| 2015/0135166 A1* | 5/2015 | Tarlow | G06F 8/75 |
| | | | 717/125 |
| 2016/0062745 A1* | 3/2016 | Rao | G06F 8/33 |
| | | | 717/109 |
| 2016/0188301 A1* | 6/2016 | Zang | G06F 8/33 |
| | | | 717/113 |
| 2017/0109139 A1* | 4/2017 | Bitner | G06F 8/33 |
| 2018/0107478 A1* | 4/2018 | Codato | G06F 8/71 |
| 2018/0189269 A1* | 7/2018 | Quirk | G06F 40/289 |
| 2018/0210713 A1* | 7/2018 | Busjaeger | G06F 16/2471 |
| 2018/0232211 A1* | 8/2018 | Maurya | G06F 8/10 |
| 2019/0086988 A1* | 3/2019 | He | G06F 1/3212 |
| 2019/0114672 A1* | 4/2019 | Jacobs | G06N 3/084 |
| 2019/0213194 A1* | 7/2019 | Zhang | G06N 20/00 |
| 2019/0303107 A1* | 10/2019 | Kelly | G06N 20/20 |
| 2019/0303115 A1* | 10/2019 | Kelly | G06F 8/33 |
| 2019/0370393 A1* | 12/2019 | Finch | G06F 16/3338 |
| 2020/0160458 A1* | 5/2020 | Bodin | G06F 8/33 |
| 2021/0303447 A1* | 9/2021 | Haze | G06F 11/3664 |

OTHER PUBLICATIONS

Iyer et al., "Summarizing source code using a neural attention model," Proceedings of the 54th Annual Meeting of the Association for Computational Linguistics, Aug. 12, 2016, Retrieved on Nov. 2, 2019 from <https://www.aclweb.org/anthology/P16-1195.pdf> entire document.

Wightman et al., "Snipmatch: Using source code context to enhance snippet retrieval and parameterization," Proceedings of the 25th annual ACM symposium on User interface software and technology, Oct. 10, 2012 Retrieved on Nov. 2, 2019 from <https://joelbrandt.com/publications/wightman_uist2012_snipmatch.pdf> entire document.

Klibert, "Code Editor Essentials Part I: How to Speed Up Cursor Movements." 10Clouds, Aug. 19, 2015, Retrieved on Nov. 2, 2019 from <https://10clouds.com/blog/code-editor-essentials-part-i-how-to-speed-up-cursor-movements/> entire document.

* cited by examiner

```
import numpy as np
import matplotlib.pyplot as plot x = np.linspace(-1, 1)
y = np.tanh(x)
graph_x_and_y|
    plot.plot(x, y)
    plot.show()

plot.plot(x, y, label='_nolegend_')
    plot.show()
```

841 → (pointing to code)
842, 840, 846, 848 (labels)

FIG. 8E

```
import numpy as np
import matplotlib.pyplot as plot x = np.linspace(-1, 1)
y = np.tanh(x)
plot|
    plot.plot
    ...(x, y)
    ...(x, y, label='_nolegend_')
    ...(x, y, color='red')
```

851, 852, 853, 854, 855, 850 (labels)

FIG. 8F

```
import numpy as np
import matplotlib.pyplot as plot x = np.linspace(-1, 1)
y = np.tanh(x)
graph_x_and_y|

Plot graph of x and y

Plot graph of x and y without legend
```

FIG. 8G

```
import numpy as np
import matplotlib.pyplot as plot x = np.linspace(-1, 1)
y = np.tanh(x)
plot|

Plot graph
    ... of x and y
    ... of x and y without a legend
    ... of y and x
```

FIG. 8H

```
import numpy as np      import matplotlib.pyplot as plot
884  x = np.linspace(-1, 1)
     y = np.tanh(x)
     plot|
         plot.plot(x, y)
         plot.show()

plot.plot(x, y, label='_nolegend_')
         plot.show()
```

```
894  > cd /home
     > ls |
         ls -l
         cd bin ls -s
         cd bin
```

CODE COMPLETION

CROSS-REFERENCE TO RELATED APPLICATIONS

This application claims the benefit of U.S. Provisional Patent Application No. 62/735,024, filed Sep. 22, 2018, which is hereby incorporated by reference in its entirety.

FIELD OF INVENTION

The present disclosure relates generally to methods and systems for code completion during programming and development.

BACKGROUND

Much of the computer programming process involves reusing existing patterns rather than developing completely new code. When this situation arises, programmers have to cut and paste code from one place to another and then customize it for a new use. The programmer must locate and identify a prior useful piece of code, perform multiple click actions to select and move the code, and then properly customize the code for the new use. The process is unnecessarily repetitive and distracts the programmer from his or her tasks. Yet, there are a lack of tools to help automate the process.

In particular, existing software development tools are inadequate in several respects. First, existing tools lack the ability to automatically identify reusable code from local codebases, such as the user's own code or the team's code. Second, existing tools lack capabilities in multi-token completions, where a suggested completion of a line or lines of code includes multiple tokens instead of just a single token. Third, existing tools rely on hard-coded rules and heuristics rather than using machine learning to learn from data. Fourth, existing tools do not allow for customizing a code completion by the application of artificial intelligence or through user interface elements. Fifth, existing tools do not suggest predicted ways to change a piece of code or navigate in an editing environment based on past user actions or other data.

SUMMARY

In some embodiments, a programming co-pilot system is provided that may integrate with a code editor. The programming co-pilot system may provide functionality such as code completion, predictive editing, and predictive navigation.

One embodiment relates to a computer-implemented method for code completion. An event is detected in an editor that triggers code completion. The programming co-pilot system may determine or more features indicative of the source code where the code completion occurs, such as a cursor location. The features may be used to search for code snippets in a codebase, where the codebase may be personal to the programmer, be a codebase of a team, or be an external codebase. One or more code snippets may be identified from the codebase and displayed in a ranked order. A selection of a code snippet may be received, and the selected code snippet may be inserted into the source code. In some embodiments, code may be inserted automatically without requiring additional selection or interaction by the user.

In an embodiment, the code snippets in the code base comprise multiple tokens. In other embodiments, the code snippets may comprise a single token.

Some embodiments relate to keyword-driven completion. In an exemplary method, a code completion is performed based on features of the source code in the editor. In addition, one or more keywords are received from the user. The features of the code and the keywords entered by the user are used together to identify relevant code snippets for display to the user.

Some embodiments relate to predictive editing. In an exemplary method, an event is detected that is indicative of a need for automatic refactoring. One or more features of the source code may be determined and analyzed. The features may be analyzed to determine that automatic refactoring is needed and to determine the appropriate automatic refactoring action. The automatic refactoring action may be displayed to the user as an option, or may be performed automatically.

Some embodiments relate to predictive navigation. In an exemplary method, an event is detected that is indicative of a need for automatic navigation. One or more features of the source code may be determined and analyzed. The features may be analyzed to determine that automatic navigation is desired and to determine the appropriate automatic navigation action. The automatic navigation action may be displayed to the user as an option, or may be performed automatically.

BRIEF DESCRIPTION OF THE DRAWINGS

The present disclosure will become better understood from the detailed description and the drawings, wherein:

FIG. 8E illustrates an exemplary user interface that may be used in some embodiments.

FIG. 8F illustrates an exemplary user interface that may be used in some embodiments.

FIG. 8G illustrates an exemplary user interface that may be used in some embodiments.

FIG. 8H illustrates an exemplary user interface that may be used in some embodiments.

FIG. 8I illustrates an exemplary user interface that may be used in some embodiments.

FIG. 8J illustrates an exemplary user interface that may be used in some embodiments.

DETAILED DESCRIPTION

Figure 1:
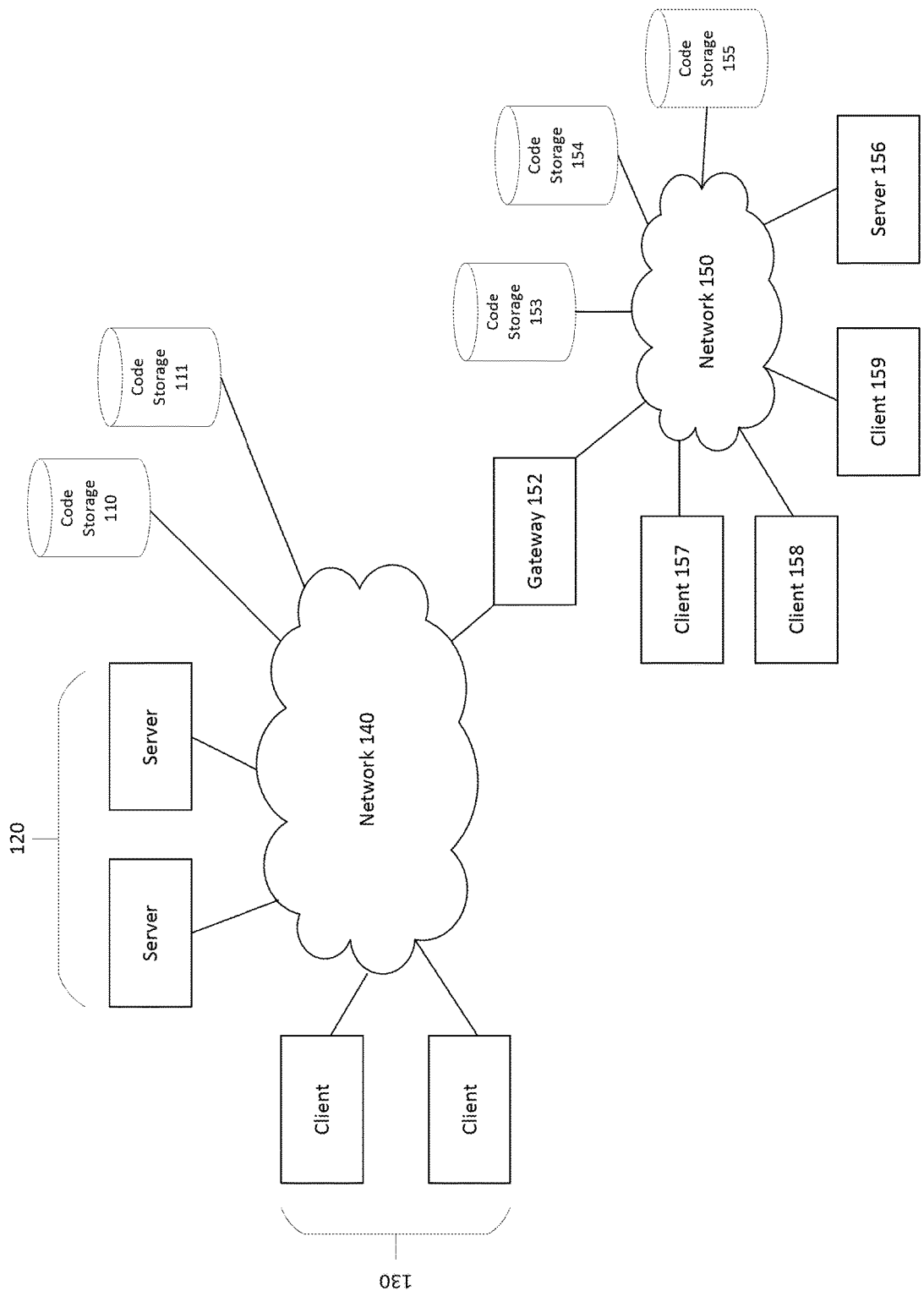
FIG. 1 illustrates an exemplary network environment that may be used in an embodiment.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

FIG. 1 is a block diagram illustrating an exemplary network environment that may be used in an embodiment. The network environment may include one or more clients and servers connected via a network 140. The network 140 may include a local area network (LAN), a wide area network (WAN), a telephone network, such as the Public Switched Telephone Network (PSTN), an intranet, the Internet, or a combination of networks. The network may include external code storage 110, 111 that store computer code, such as source code. Some external code storage 110, 111 may be globally accessible to any entity on the network 140. Other external code storage 110, 111 may be private and require login-in and authentication to access. The network 140 may include various entities such as servers 120 and clients 130.

Local network 150 may connect to network 140 through gateway 152. In some embodiments, the local network 150 may be private and access controlled so that entities on the network 140 cannot generally access the resources on local network 140. However, entities on the local network 150 may access and share at least some of the resources on the local network 150. Code storage 153 may comprise code stored on the local network 150 after having been web scraped from external code sources 110, 111. Code storage 154 may exist on the local network 150 and may store code from a team of programmers working from clients 157, 158, 159 on the local network 150. In an embodiment, a code storage 155 is an individual code storage that stores code of just one of the programmers on the team. The code storage 155 may be separate from code storage 154 or may be, for example, a subset of code storage 154. Code storage may be any kind of storage. In some embodiments, a code storage comprise a codebase, which is a collection of code for building one or a set of software systems, applications, or software components. Moreover, in some embodiments, a codebase comprises a code repository, where a repository keeps track of changes in the codebase over time and may allow version control and allowing checking in and checking out of code. In some embodiments, code storage comprises a database. A database is any kind of storage and no particular type of database is required. For example, a database may comprise storage of files in memory or permanent storage. Server 156 may exist on the local network 150 and run a program comprised of code from the team of programmers. The code may be team code stored in code storage 154 or an individual branch or subset stored on code storage 155. Server 156 may generate logs or output during the execution of the program, and the logs or output may be retrieved by clients 157, 158, 159 for monitoring or debugging of the program.

Additional servers, clients, computer systems, and local networks may be connected to network 140. It should be understood that where the terms server, client, or computer system are used, this includes the use of networked arrangements of multiple devices operating as a server, client, or computer system. For example, distributed or parallel computing may be used.

Figure 2A:
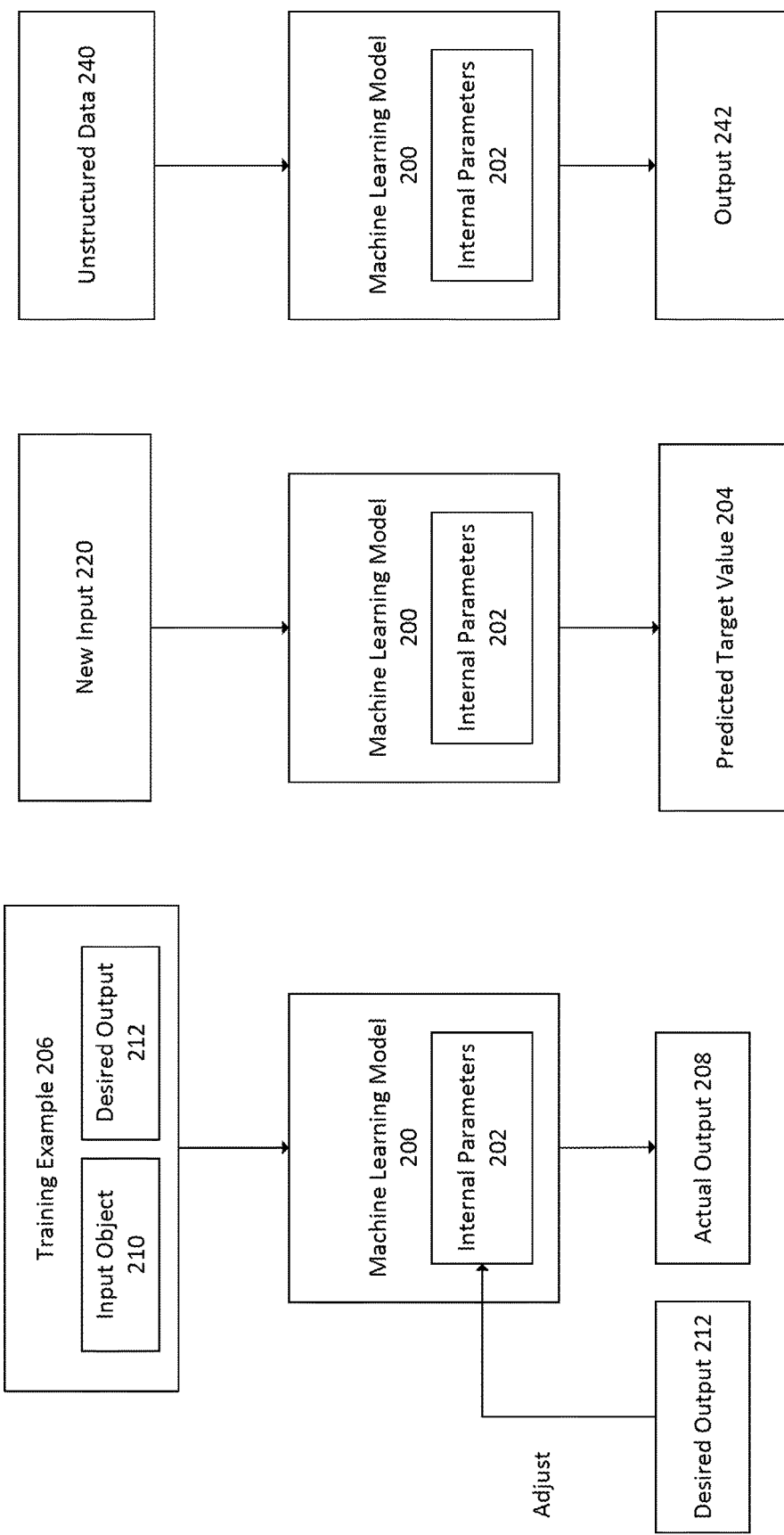
FIG. 2A illustrates an exemplary machine learning model that may be used in an embodiment.

FIG. 2A illustrates an exemplary machine learning model 200. A machine learning model 200 may be a component, module, computer program, system, or algorithm. Some embodiments herein use machine learning for code completion, predictive editing, or predictive navigation. Machine learning model 200 may be used as the model to power those embodiments described herein. In some embodiments, machine learning model 200 uses supervised learning. In such an embodiment, machine learning model 200 is trained with training examples 206, which may comprise an input object 210 and a desired output value 212. The input object 210 and desired object value 212 may be tensors. A tensor is a matrix of n dimensions where n may be any of 0 (a constant), 1 (an array), 2 (a 2D matrix), 3, 4, or more.

The machine learning model 200 has internal parameters that determine its decision boundary and that determine the output that the machine learning model 200 produces. After each training iteration, comprising inputting the input object 210 of a training example in to the machine learning model 200, the actual output 208 of the machine learning model 200 for the input object 210 is compared to the desired output value 212. One or more internal parameters 202 of the machine learning model 200 may be adjusted such that, upon running the machine learning model 200 with the new parameters, the produced output 208 will be closer to the desired output value 212. If the produced output 208 was already identical to the desired output value 212, then the internal parameters 202 of the machine learning model 200 may be adjusted to reinforce and strengthen those parameters that caused the correct output and reduce and weaken parameters that tended to move away from the correct output.

The machine learning model 200 output may be, for example, a numerical value in the case of regression or an identifier of a category in the case of classifier. A machine learning model trained to perform regression may be referred to as a regression model and a machine learning model trained to perform classification may be referred to as a classifier. The aspects of the input object that may be considered by the machine learning model 200 in making its decision may be referred to as features.

After machine learning model 200 has been trained, a new, unseen input object 220 may be provided as input to the model 200. The machine learning model 200 then produces an output representing a predicted target value 204 for the new input object 220, based on its internal parameters 202 learned from training.

Machine learning model 200 may be, for example, a neural network, support vector machine (SVM), Bayesian network, logistic regression, logistic classification, decision tree, ensemble classifier, or other machine learning model. Machine learning model 200 may be supervised or unsupervised. In the unsupervised case, the machine learning model 200 may identify patterns in unstructured data 240 without training examples 206. Unstructured data 240 is, for example, raw data upon which inference processes are desired to be performed. An unsupervised machine learning model may generate output 242 that comprises data identifying structure or patterns.

A neural network may be comprised of a plurality of neural network nodes, where each node includes input values, a set of weights, and an activation function. The neural network node may calculate the activation function on the input values to produce an output value. The activation function may be a non-linear function computed on the weighted sum of the input values plus an optional constant. In some embodiments, the activation function is logistic, sigmoid, or a hyperbolic tangent function. Neural network nodes may be connected to each other such that the output of one node is the input of another node. Moreover, neural network nodes may be organized into layers, each layer comprising one or more nodes. An input layer may comprise the inputs to the neural network and an output layer may comprise the output of the neural network. A neural network may be trained and update its internal parameters, which comprise the weights of each neural network node, by using backpropagation.

A convolutional neural network (CNN) may be used in some embodiments and is one kind of neural network and machine learning model. A convolutional neural network may include one or more convolutional filters, also known as kernels, that operate on the outputs of the neural network layer that precede it and produce an output to be consumed by the neural network layer subsequent to it. A convolutional filter may have a window in which it operates. The window may be spatially local. A node of the preceding layer may be connected to a node in the current layer if the node of the preceding layer is within the window. If it is not within the window, then it is not connected. A convolutional neural network is one kind of locally connected neural network, which is a neural network where neural network nodes are connected to nodes of a preceding layer that are within a spatially local area. Moreover, a convolutional neural network is one kind of sparsely connected neural network, which is a neural network where most of the nodes of each hidden layer are connected to fewer than half of the nodes in the subsequent layer.

A recurrent neural network (RNN) may be used in some embodiments and is one kind of neural network and machine learning model. A recurrent neural network includes at least one back loop, where the output of at least one neural network node is input into a neural network node of a prior layer. The recurrent neural network maintains state between iterations, such as in the form of a tensor. The state is updated at each iteration, and the state tensor is passed as input to the recurrent neural network at the new iteration.

In some embodiments, the recurrent neural network is a long short-term (LSTM) memory neural network. In some embodiments, the recurrent neural network is a bi-directional LSTM neural network.

A feed forward neural network is another type of a neural network and has no back loops. In some embodiments, a feed forward neural network may be densely connected, meaning that most of the neural network nodes in each layer are connected to most of the neural network nodes in the subsequent layer. In some embodiments, the feed forward neural network is a fully-connected neural network, where each of the neural network nodes is connected to each neural network node in the subsequent layer.

A graph neural network (GNN) is a type of neural network that may be used in some embodiments. In a GNN, the input data may comprise a graph, comprising nodes and edges between the nodes. The neural network may output a graph. The graph may be directed or undirected. In an embodiment, a GNN performs aggregation between nodes that share an edge and are thus neighbors.

A gated graph sequence neural network (GGSNN) is a type of neural network that may be used in some embodiments. In a GGSNN, the input data is a graph, comprising nodes and edges between the nodes, and the neural network outputs a graph. The graph may be directed or undirected. A propagation step is performed to compute node representations for each node, where node representations may be based on features of the node. An output model maps from node representations and corresponding labels to an output for each node. The output model is defined per node and is a differentiable function that maps to an output.

Neural networks of different types or the same type may be linked together into a sequential or parallel series of neural networks, where subsequent neural networks accept as input the output of one or more preceding neural networks. The combination of multiple neural networks may comprise a single neural network and may be trained from end-to-end using backpropagation from the last neural network through the first neural network.

In an embodiment, machine learning model 200 may comprise a lexical language model. The lexical language model may be used to model the probability of a portion of text in a language. In an embodiment, the lexical language model may model the probability of text in a programming language. The probabilities may be computed by statistical analysis of pre-existing examples. In some embodiments, the lexical language model is entirely statistical and does not encode grammar rules of the language.

In an embodiment, machine learning model 200 may comprise beam search. In a beam search, a search may proceed breadth first and a set number of candidates may be expanded at each level of the search. For example, in one embodiment, code completion system 342 may predict the next token in a completion. The probability of the completion may be computed based on inputting the existing code before the completion plus the proposed completion into the language model and receiving as output a probability value. Beam search may be used to search across multiple candidate next tokens by trying a plurality of tokens and computing their probability. In the beam search, the n best-scoring candidates may be selected for further expansion by adding a succeeding token to the proposed completion and again testing the probability based on inputting the tokens into the language model. The n best-scoring candidates may again be chosen for further expansion, and the process may be repeated recursively. The variable n may be referred to as the branching factor of the beam search. By expanding only n candidates at each level, the algorithm avoids having to expand an exponential number of candidate nodes, which could be the case if a traditional breadth-first search is used.

In an embodiment, a more intelligent beam search may be applied based on syntactic or semantic constraints. Syntactic constraints may be used based on the formal grammar of the programming language of the code. The beam search may choose to only expand next tokens that are allowed in the syntax. For example, in many programming languages, the word "if" is a special token indicating an if statement and an "if" cannot follow another "if". Therefore, when selecting a next candidate token, the beam search may prune tokens that are not allowed in the syntax. Vice versa, the beam search may choose to expand only tokens that are allowed in the syntax. Semantic constraints may be used based on the semantic meaning of the tokens. The beam search may choose to only expand next tokens that are semantically allowed. For example, if the preceding tokens are a variable name and a "." then in some languages the following token must be a method or variable of the class of the preceding variable. The beam search may open up a look up table to identify all the methods and variables of the class and use each of these as next token expansions. In some embodiments, it may choose expansions only based on these methods and variables because they are the only tokens that are semantically allowed.

Figure 2B:
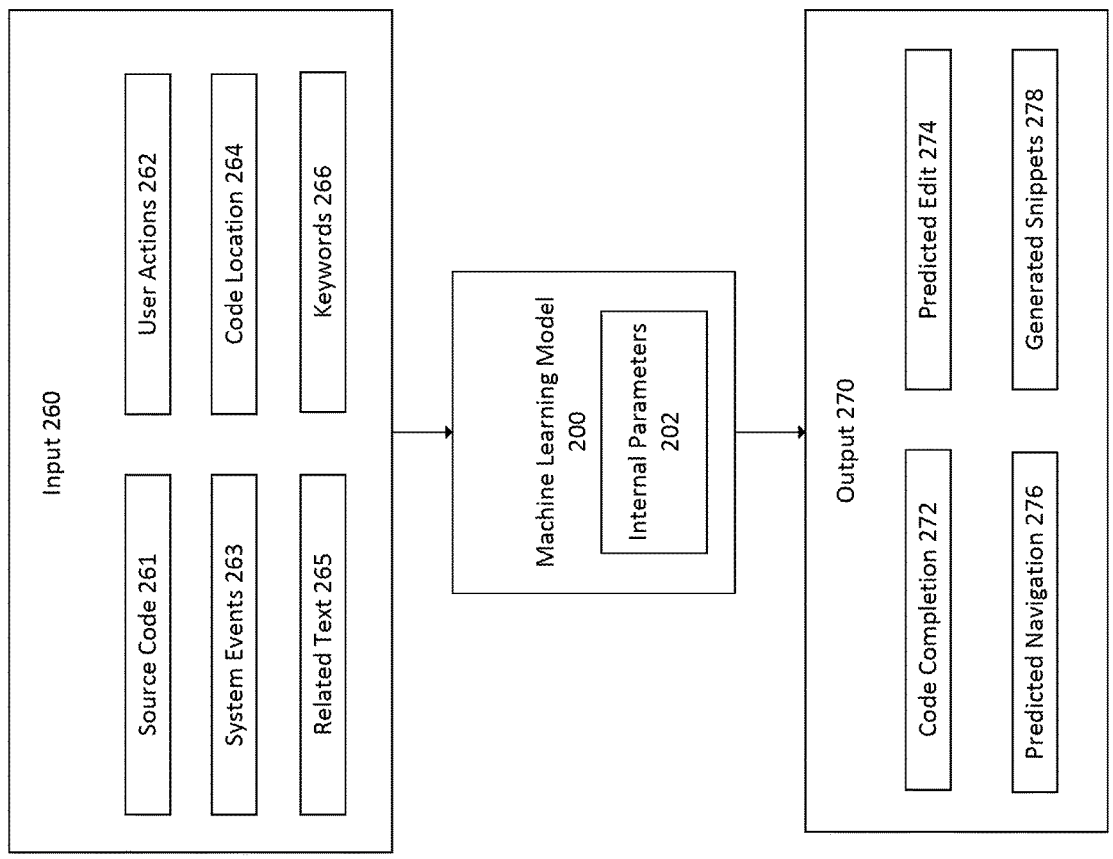
FIG. 2B illustrates an exemplary machine learning model that may be used in an embodiment.

FIG. 2B illustrates use of the machine learning model 200 to perform inference on input 260 comprising data relevant to a programming co-pilot system 340. Input 260 may comprise any of source code 261, user actions 262, system events 263, the location of code 264 such as in external code storage, team code storage, or personal code storage, related text 265 that relates to source code 261, keywords 266, or other data. The machine learning model 200 performs inference on the data based on its internal parameters 202 that are learned through training. The machine learning model 200 generates an output 270 comprising information or data relevant to helping a programmer, such as a code completion 272, predicted edit 274, predicted navigation 276, or generated snippets 278.

Figure 3:
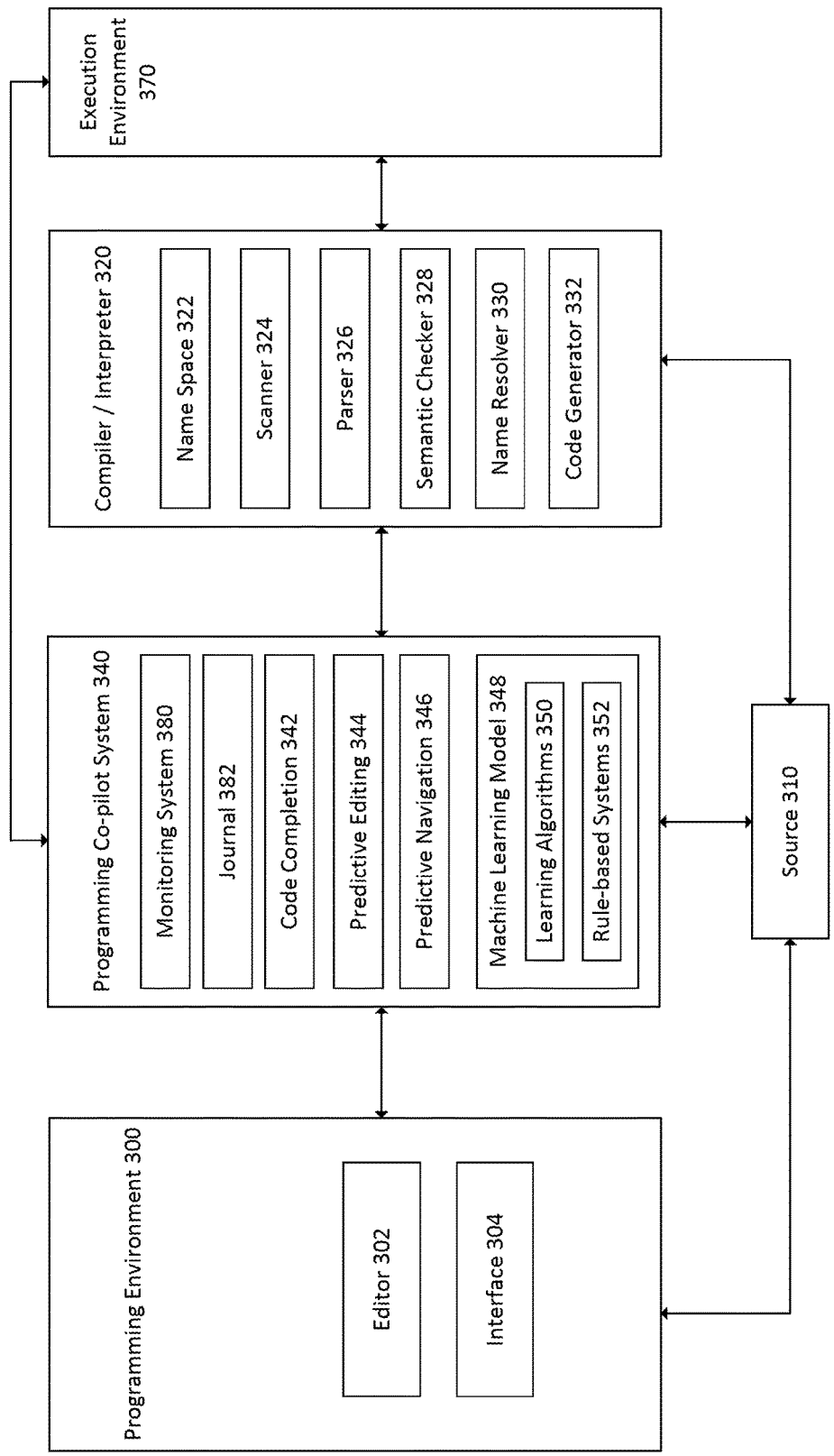
FIG. 3 illustrates an exemplary system for software development.

FIG. 3 illustrates an exemplary system for software development. Source code 310 may be provided and edited in a programming environment 300. The programming environment may allow interactive editing of the source code 310 by a user, such as a programmer. A programming environment may include an editor 302 and an interface 304. The editor 302 may provide for the developing, such as writing and editing, of source code 310. The interface 304 may present a human viewable or usable interface for using the editor 302. For example, the interface 304 may comprise a graphical user interface. Many different kinds of editor 302 may be used such as an integrated development environment (IDE), text editor, or command line. In some embodiments, an IDE such as Eclipse, Sublime, Atom, or Visual Studio may be used. In other embodiments, a shell, terminal, or operating command line such as the Bash command line is used as a programming environment and may comprise an editor 302. In still other embodiments, single input interactive environments, such as Read-Eval-Print Loop (REPL), may be used as the editor 302.

A compiler or interpreter 320 may compile the code 310 into executable instructions or an intermediate representation, or interpret the source code 310 for execution. The compiler/interpreter 320 may comprise a namespace 322 that can be used to store symbols, such as identifiers and types, and to allow for name resolution 330. In some embodiments, the compiler/interpreter 320 may comprise a scanner 324, parser 326, semantic checker 328, name resolver 330, and code generator 332. Scanner 324 may accept as input the source code 310 and split expressions and language statements into tokens that can be processed by the parser 326 to determine the grammatical structure of a program. A token may be a single element of a programming language such as a constant, identifier, operator, separator, reserved word, or other element. In some embodiments, a token is atomic and is the smallest semantic unit of a programming language, such that the token cannot be broken down further into units with semantic meaning in the language. The parser 326 may parse the tokens and organize them according to a grammar of a programming language. In some embodiments, parser 326 builds a parse tree. Semantic checker 328 may perform semantic checking of a computer program and may identify and throw errors that are semantic in nature. The name resolver 330 may resolve names in the parse tree to elements of the namespace 322. Code generator 332 may translate the parse tree, or other intermediate representation of the source code, into a target language. The target language may be executable instructions, such as a binary executable, or an intermediate language that may be interpreted for execution. In an execution environment 370, code may be executed, such as for testing or production.

Programming co-pilot system 340 may interact with the programming environment 300, source code 310, and compiler/interpreter 320 to provide programming assistance to the programmer. Programming co-pilot 340 may include a monitoring system 380 to monitor user actions in an editor 302 and system events such as inputs, outputs, and errors. Programming co-pilot 340 may also include a journal 382, which may comprise a digital record of the history of data, such as sequential changes to and versions of source code, user interactions in the editor 302, user interactions in other parts of a system such as a terminal or web browser, system events, and other data. The journal 382 may record data sequentially so that a sequence of events may be exactly reconstructed. Programming co-pilot 340 may include functionalities such as code completion system 342, predictive editing system 344, predictive navigation system 346, and other features. Programming co-pilot 340 may include machine learning model 348 to power its functionality, including learning algorithms 350 that learn from data or rule-based systems 352 that use hard-coded rules or heuristics. Although illustrated as one unit, multiple machine learning models 348 may be used in practice to perform or implement different functionality. For example, each function may have a separate machine learning model. Programming co-pilot system 340 may interface with the programming environment 300 through API calls, data streams, inter-process messages, shared data structures, or other methods. In some embodiments, the programming co-pilot 340 is a separate program from the programming environment 300. In other embodiments, the programming co-pilot is a sub-program or component of the programming environment 300.

An embodiment of a programming co-pilot system 340 and its various functionality will be described herein. The programming co-pilot system 340 may include various combinations of the features described herein. In some embodiments, it includes all the functionalities described herein, and, in other embodiments, it includes only a subset of the functionalities described.

Embodiments may operate on any kind of source code including imperative programming languages, declarative code, markup languages, scripting languages. and other code. For example, source code may be Python, Perl, PHP, Javascript, Java, C, C++, HTML, reStructuredText, Markdown, CSS, shell scripts (such as bash, zsh, etc.), and so on.

A. Code Completion

In an embodiment, programming co-pilot system 340 includes a code completion system 342. Code completion may provide the programmer with one or more options to automatically insert, complete, or modify code in the programming environment. For example, as the programmer types code, the code completion system 342 may predict and present options for code snippets to insert into the source code 310 displayed in the editor 302. In response to user selection, the code completion system 342 may insert the code snippet into the source code 310 in the editor 302. In other embodiments, the code completion system 342 may predict and insert the code snippets into the source 310 automatically without user input or selection.

Figure 4:
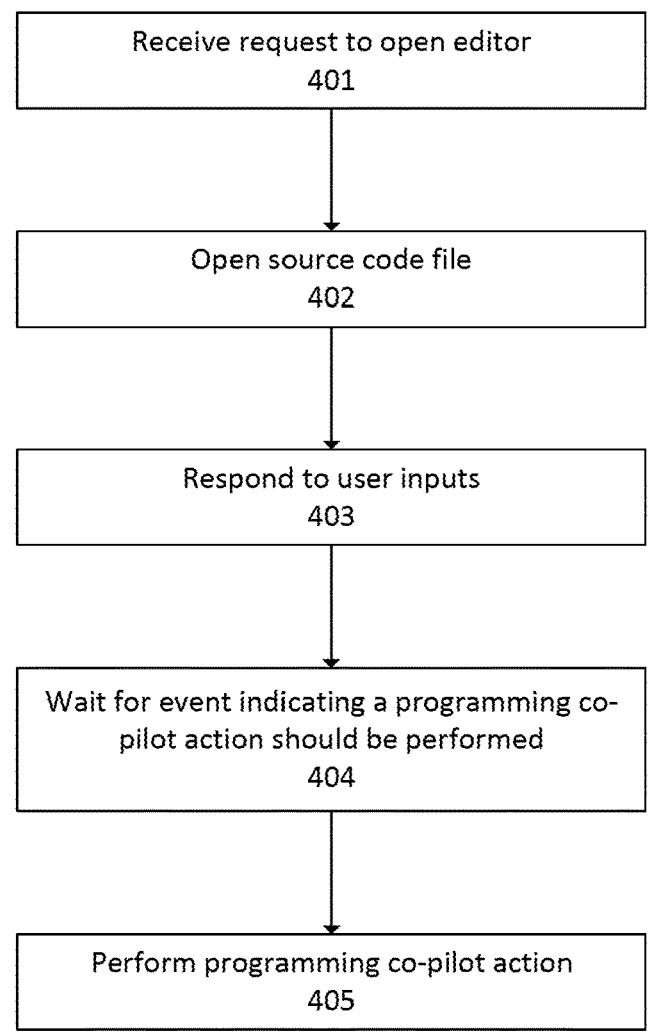
FIG. 4 illustrates an exemplary method for initiating a programming co-pilot action.

FIG. 4 illustrates an exemplary method 400 for initiating a programing co-pilot action, such as code completion, predictive editing, predictive navigation, or other actions. In step 401, a request is received from a user to open an editor 302 of programming environment 300 and the editor is launched 304. In step 402, a source code file is opened and loaded from memory, such as permanent memory or short-term memory, and source code 310 is visually displayed in the editor 302. The editor 302 may include user interface elements for performing actions on the source code 310. In step 403, the editor 302 responds to inputs of the programmer to perform additions, insertions, modifications, edits, or deletions of the source code 310. Inputs of the programmer may be, for example, inputs from a physical or virtual keyboard, taps, clicks, voice commands, or other inputs. In some embodiments, the source code 310 is buffered in short-term memory and edits or changes are made in the buffered in-memory version of the source code 310 until a save file action is performed to save the updated source code file in permanent memory. In step 404, in parallel with the editor allowing the programming to edit the code, the code completion system 342 waits for an event indicating that a programming co-pilot action, such as code completion or predictive editing, should be performed. An event may be an electronic notification in a computer system indicating that an occurrence or activity has taken place. The triggering event may be of various possible types. For example, the triggering event may be detecting that the user has stopped typing for a specified period of time, detecting that the user has just completed typing a token, detecting that the user has added a new character, deleted a character, or otherwise modified the source code 310, detecting that the user has finished typing a specific character, such as a space, determining that a specified time interval has elapsed since the last code completion suggestion, or other events.

The use of events is optional and, alternatively, the code completion system may run continuously and constantly monitor for potential code completion, predictive editing, or predictive navigation. The code completion system may estimate the value of presenting a code completion or suggested predictive editing at each iteration and only present code completions or suggested predictive editing to the user if the estimated value of the code completion or predictive editing exceeds a threshold.

In step 405, when it is determined that code completion, predictive editing, predictive navigation, snippet generation, or other programming co-pilot actions should be performed, the code completion system 342 performs the code completion, predictive editing, predictive navigation, snippet generation, or other programming co-pilot action.

Figure 5A:
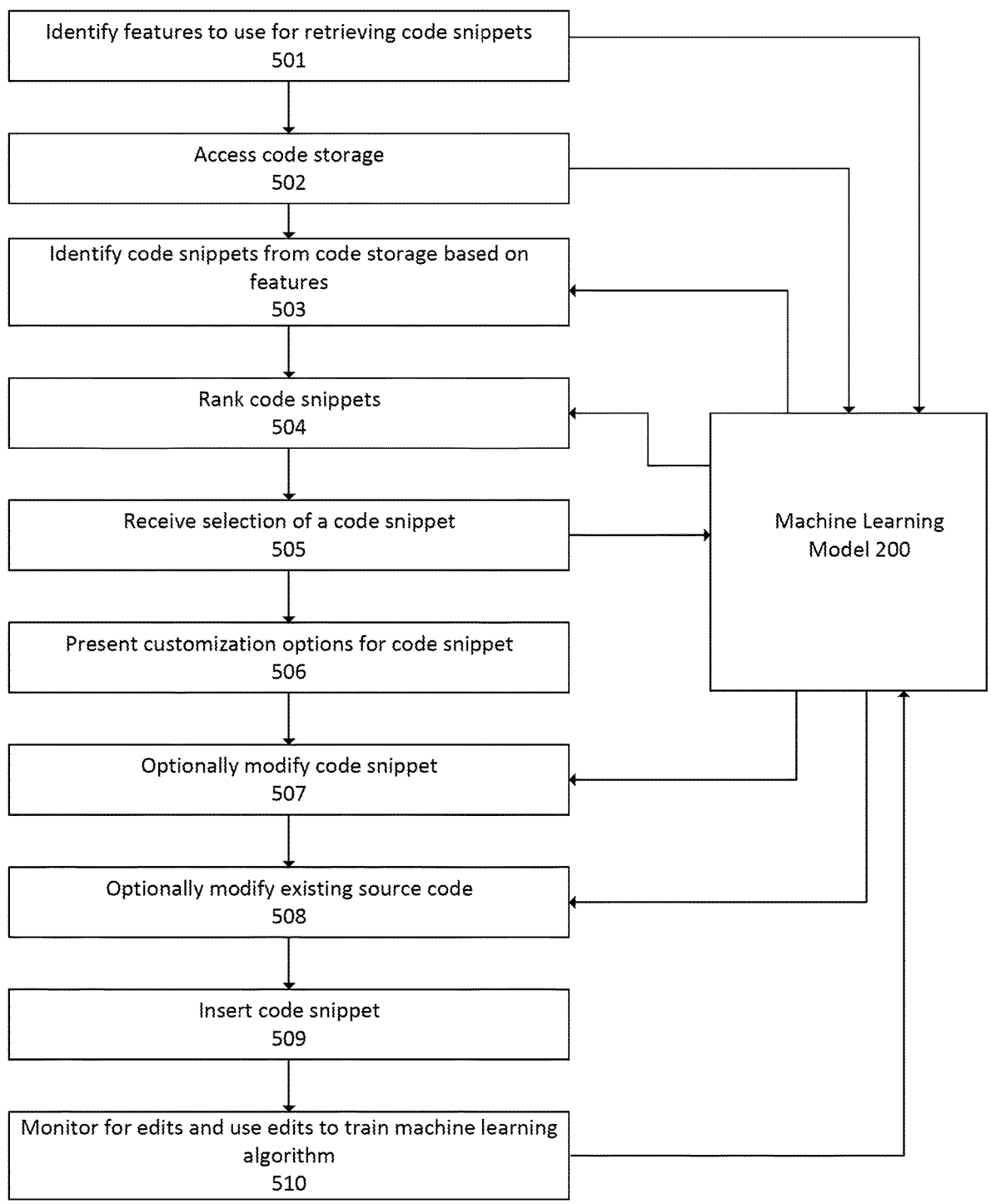
FIG. 5A illustrates an exemplary method for performing code completion.

FIG. 5A illustrates an exemplary method 500 for performing code completion. In step 501, the code completion system 342 may analyze or identify a set of features to determine what code snippets to retrieve to offer as candidate code completions. Features that may be used include the current cursor position in editor 302, the token immediately preceding the cursor, a most recent token or a plurality of recent tokens typed by the programmer, a plurality of tokens preceding the cursor or succeeding the cursor, tokens on the same line as the cursor, tokens on a set of preceding lines of the cursor or on succeeding lines of the cursor, an identifier of the current function that the cursor is located in, identifiers located near the cursor, the code located near the cursor, code located in the same function as the cursor, the most recent code typed by the programmer, and other features. In an embodiment, the features are used as inputs to a machine learning model 200 in later steps in order to perform prediction.

In step 502, the code completion system 342 may access a code storage to identify code snippets to offer to the programmer as code completions.

In some embodiments, the code storage accessed is an external code storage 110, 111, which is globally and publicly accessible. For example, external code storage 110, 111 may comprise code snippets collected from online communities, apps, or websites for sharing code or expert knowledge, examples being Stack Overflow or Github. A web scraper may be used to access and download snippets from an online community, app, or website to store the snippets in a code storage 153.

In other embodiments, the code storage used is team code database 154, which is local to the programmer's team and is not publicly accessible. The team code storage 154 may be a library of code generated by programmers on the team. In some embodiments, the code in the storage 154 is collected from an existing project being created by the team. However, in other embodiments, the code is generated for other reasons, such as from past projects or being generated solely for use as exemplars.

In other embodiments, the code storage used is personal code storage 156 comprising only the programmer's own code. For example, in some embodiments, the personal code storage 156 comprises code that the programmer wrote for the current project. The programmer's own code may be identified by analyzing the identity of the entity performing each code commit in a code versioning system, such as git or subversion. Code committed by the programmer, as identified by the programmer's identifier in the code versioning system, can be determined to be the programmer's own code.

Code storage may store may than just code and may store text and multimedia related to the code. In some embodiments, code storage may include documentation, questions and answers, tutorials, and other information about code. For example, code storage may store code downloaded from a crowd-sourced website like StackOverflow and associated questions and answers. Code storage may include stored links between code and associated content.

In still other embodiments, external global code storage, team code storage, and personal code storage may all be searched for code snippets for performing code completion. In some embodiments, the source of the code snippet may affect the ranking of the code completion in the list of code completions presented to the programmer. For example, a code snippet that is found in the personal code storage may be given priority over a code snippet found in the team code storage, and a code snippet in the team code storage may be given priority over a code snippet found in a global code storage. The greater degree of connection of the personal code storage and team code storage may mean that it is preferable in some embodiments to give priority to code snippets from those locations.

Code snippets may comprise a single token, such as a single keyword, identifier, type, or other token. In other embodiments, code snippets for code completion may comprise multiple tokens. In some embodiments, code snippets may comprise a plurality of lines of code. For example, code snippets may include a function definition, a programming pattern, a programming idiom, a function call, an API function call, a chained attribute expression, a binary expression, a Boolean expression, a list, set, or dictionary comprehension, a variable assignment, or other multi-token code snippets.

One or more code snippets, once identified, or extracted features of said snippets may also be input to machine learning model 200 so that the model 200 may perform inference.

In step 503, relevant code snippets are identified from the code storage based on features, such as any of the features described above, for example but not limited to, in step 501. In one embodiment, the relevant code snippets are determined by machine learning model 200 using deterministic, hard-coded rules. For example, in one embodiment, typing a particular token for a class automatically selects as potential code completions the sub-methods or variables of the class. In another example, typing the name of a function automatically selects as a potential code completion a code snippet representing a pattern for making a call to the class.

In other embodiments, the relevant code snippets are determined by machine learning model 200 by using a learning algorithm, such as supervised or unsupervised learning. Any of the machine learning methods described herein may be used. The machine learning algorithm may be trained based on prior code examples of this programmer, other programmers on the team, or other programmers not on the team, where a code completion was suggested by code completion system 342. The machine learning algorithm may also be trained based code snippet popularity data, such as number of clicks from users, based on actions of the user in the editor preceding the code completion action (such as the identity of the file that the user opened, or edits made by the user), and other data. Training examples are generated by taking as input objects one or more features of the source code when the code completion was presented. The ground-truth value for the input object may be set to 1, or positive, if the code completion was presented by the code completion system 342 and received a positive input from the user, whereas the ground-truth value for the input object may be set to 0, or negative, if the code completion was presented by the code completion system and received a negative input from the user. Examples of positive inputs include detecting selection of the code snippet by the user, hovering or focusing on the code snippet by the user, long dwell time on the code snippet by the user, skipping higher ranked code snippets to select this code snippet, and so on. Examples of negative inputs include detecting that the user did not select the code snippet and skipping this code snippet to select a lower ranked code snippet. In this manner, the code completion system 342 may adjust the code snippets that it suggests based on past usage of code completion system 342 by the programmer, by programmers on the same team, or by other programmers in general.

In an alternative embodiment, the code snippets may be generated by machine learning model 200 instead of being retrieved from code storage. In one embodiment, the code snippets may be generated by deterministic, hard-coded rules. In other embodiments, the relevant code snippets are generated by machine learning model 200 by using a learning algorithm, such as supervised or unsupervised learning. Any of the machine learning methods described herein may be used. The machine learning algorithm may be trained based on prior code examples of this programmer, other programmers on the team, or other programmers not on the team, where a code completion was suggested by code completion system 342. The machine learning algorithm may also be trained based code snippet popularity data, such as number of clicks from users, based on actions of the user in the editor preceding the code completion action (such as the identity of the file that the user opened, or edits made by the user), and other data.

In step 504, the relevant code snippets that are found may be ranked. Ranking may be performed to present the most likely or most useful code completions first and present less likely or helpful code completions later. Ranking may be performed by the machine learning model 200 based on the data input to the model. Methods of ranking are described in more detail herein.

In step 505, a selection of a code snippet may be received from a user. Selection may be by user input such typing, tapping, clicking, voice commands, or other input. The selected code snippet may be input to the machine learning model 200 for inference about, for example, potential modifications to the code snippet or other source code.

In step 506, optionally, customization options may be presented to the programmer to customize the code snippet before insertion into the source code 310. For example, some code snippets may have blanks that the programmer may be presented with to receive input of data from the programmer to fill the blanks. In other embodiments, machine learning may be used to predict locations of a code snippet that should be customized or changed from the base version in the code database in order to be suitable for the programmer's code. In still other embodiments, code snippets in code storage are stored as templates with specified locations that are blanks to be filled in.

In step 507, optionally, the code completion system 342 may modify the selected code snippet. The modification may be according to user input from step 506 or may be due to automatic edits determined to be appropriate by the code completion system 342. In one embodiment, the code completion system 342 uses a machine learning model 200 with deterministic, rule-based methods to determine one or more edits that need to be made to the code snippet. For example, the code snippet may include locations known to require customization and hard-coded rules may be used to insert new values into those locations.

In an embodiment, the code completion system uses a machine learning model 200 based on a learning algorithm to determine that one or more edits should be made to the code snippet to customize it for the existing source code 310. For example, this determination may be made based on tokens or identifiers in the existing source code 310. In an embodiment, some tokens or identifiers in existing source code 310 are determined to correspond to tokens or identifiers in the code snippet and are used to replace them in the code snippet. This functionality may be used, for example, when a function or variable in the existing source code corresponds to a function or variable in the code snippet, but has a different name.

In one embodiment, the selected candidate code snippet includes whitespace, and the whitespace is customized for the programmer. Different programming teams may use different norms for how they use whitespace in source code, such as "if(foo)" or "if (foo)", where the first example has no whitespace between the if, parentheses, and foo tokens and the second example has whitespace between each of these tokens. The code completion system 342 may customize the whitespace of suggested code completions, predictive edits, or keyword snippet generation according to the preferences of the team or programmer.

In one embodiment, only the selected candidate code snippet has customized whitespace. In another embodiment, one or more of the candidate code snippets also have customized whitespace. In one embodiment, the selected candidate code snippet includes whitespace, and the whitespace is customized according to one or more inferred parameters from a codebase of the programmer. In one embodiment, the selected candidate code snippet includes whitespace, and the whitespace is customized according to one or more rules that are set in a development environment.

In step 508, optionally, the code completion system 342 may modify the existing source code 310 to be consistent with the selected code snippet. The code completion system 342 may determine that changes should be made to existing source code 310 based on the selected code snippet to be inserted. Changing the existing source code 310 includes inserting new code into the existing source code 310 or modifying source code 310 at locations other than at the cursor. This determination may be made based on features of the selected code snippet, which may be manually tagged or automatically tagged or identified with machine learning. For example, in one embodiment, the code completion system 342 may parse the code snippet and determine that it uses a library that has not been imported in the existing source code 310. In response, the code completion system 342 may identify the correct library to import based on a tag on the code snippet or based on looking up identifiers in the code snippet in a database of libraries. The code completion system 342 may then present to the programmer the option to add a library import statement to the existing source code or may proceed to perform the addition automatically without prompting the user. In one embodiment, the code completion system 342 may parse the code snippet and determine that it uses a return value from a previously called function and that the return value was previously discarded. In response, the code completion system 342 may present to the programmer the option to add a new code portion that saves the return value in a variable that is then read in the code snippet and, upon selection, insert this new code portion into the existing source code 310. The insertion may be made at a location other than at the location of the cursor. Also, the code may be inserted automatically without manual intervention.

In an embodiment, the determination that existing source code needs to be modified due to the selected code snippet is performed according to a machine learning model 200 using deterministic rules. However, in another embodiment, this determination is made based on a machine learning model 200 applying a learning algorithm. The machine learning may be trained based on past examples of code snippets that were inserted into source code of prior programmers. The learning may be performed based on past examples from the programmer, the programmers on the team, or other programmers in general. In one embodiment, the machine learning model is trained based on prior programmers selecting a code snippet and the code completion system 342 detecting that the programmer subsequently made a change to the existing source code. This is used as a positive training example to train the code completion system that selection of the code snippet is associated with the subsequent change to the existing source code.

In step 509, the selected code snippet is inserted. The source code file is modified to include the code snippet at a specified location, such as at the location of the user's cursor. This insertion step may also occur earlier in this method such as between steps 505 and 508.

In step 510, optionally, the code completion system 342 may monitor for later edits or changes made subsequently to the insertion of the selected code snippet. The later edits or changes may be to the inserted code snippet or to other parts of the source code. The later edits or changes may be stored and used as training examples to train machine learning model 200 to associate the selected code snippet with the later change to the source code. The training may be used to predict changes to code snippets or existing source code in future executions of steps 507 and 508.

B. Keyword-Driven Completions

In an embodiment, code completion system 342 also includes the capability for keyword-driven completions. Instead of predicting code completions solely from context, the keyword-driven completion system may use one or more keywords input by the user paired with the context. Keyword-driven completion may use the same functionality as that of the code completion system described above, except that an additional user interface element for collecting one or more keywords from the user may be displayed. After collection of the additional keywords, the keywords are used along with context to identify and rank relevant code snippets.

In an embodiment, method 400 for initiating code completion may also be used for initiating keyword-driven code completion. As set forth in method 400, an editor 302 is opened and source code file is loaded and displayed. The editor 302 responds to user inputs to modify the source file. Meanwhile, events are monitored or, alternatively, the code completion system 342 runs continuously. When it is determined from an event or from the continuous iteration of the code completion system 342 that code completion should be performed, then a keyword-driven completion process may be performed.

In an embodiment, method 500 for performing code completion may also be used for keyword-driven code completion. The method 500 would be modified such that an additional one or more keywords are received from the user prior to performing code completion, and the code completions are selected partly on the basis of the keywords.

Figure 5B:
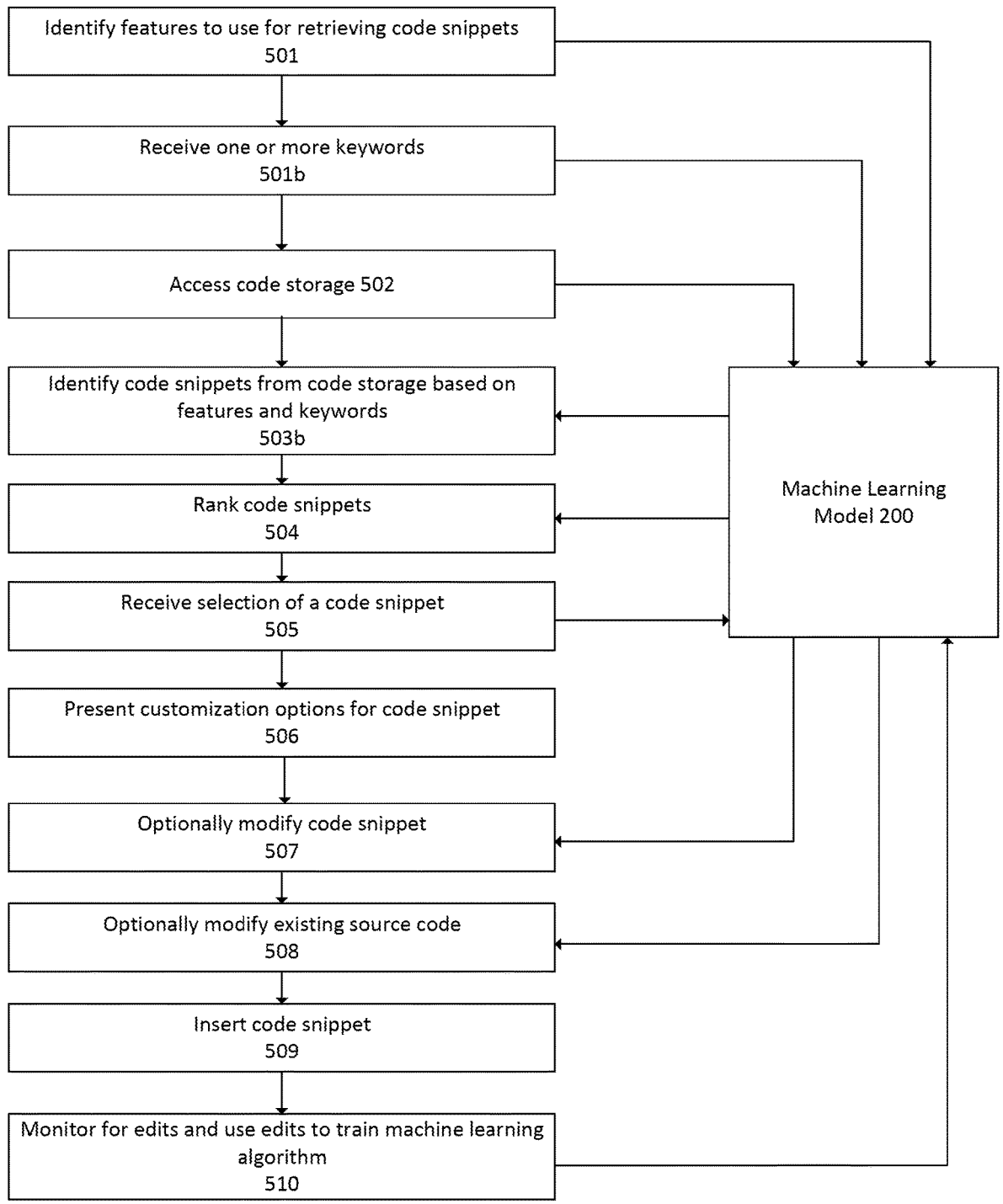
FIG. 5B illustrates an exemplary method for performing keyword-driven completion.

FIG. 5B illustrates an exemplary method 520 for keyword-driven completion. Method 520 shares many of the same steps as method 500. It differs in that step 501b has been added to accept one or more keywords input by the user. For example, the keywords may be received as a search string in a text box or other user interface element. The keywords may be used by the machine learning model 200 for identifying code snippets to return. At step 503b, the code completion system 342 identifies relevant code snippets from code storage based on features, in the same manner as in step 503. However, in step 503b, the code completion system identifies relevant code snippets based on both the features of the code that were identified and also the keywords that were received from the user in step 501b. Also, rather than identifying relevant code snippets from code storage, the code completion system 342 may instead generate the code snippet on the fly by using machine learning. When the code snippet is identified or generated, both the features of the code and the keywords may be inputs to the machine learning model 200 that performs the inference and returns the result.

Keywords may be received a variety of manners and need not be entered by the user in a text box or user interface element. The keywords may be received in a direct or indirect manner. When received in an indirect manner, the keywords may be derived from other information rather than direct entry by the user. In one embodiment, the keywords may comprise words in code comments that are near the cursor. In one embodiment, the keywords may comprise the text of a function name, such as a function definition "def getHttpResponse" being converted to keywords "get http response." In one embodiment, the keywords received are natural language keywords such as "make HTTP request." In one embodiment, the keywords received are natural language keywords having programming code syntax such as "makeHTTPRequest" or "make_http_request." It may be desirable to allow the system to detect when the user does not know an exact entity name, such as for a variable or function, and is approximating it with natural language that looks like code. In an embodiment, the system may parse the keywords by splitting them into takens based on interpreting the keywords using programming syntax. For example, the system may split tokens on underscores or at the change from lower case to uppercase in camel case syntax. In some embodiments, the keywords received may be pseudocode keywords. In one embodiment, the keywords entered by the user may apply to more than one interaction. For example, the keywords may apply to future interactions and code snippet generations for a set period of time or a set number of interactions.

In some embodiments, code snippets have one or more associated keyword tags. The keywords entered by the user may be used to filter the set of resulting keywords to those that match one or more, or in some embodiments all, the keywords entered by the user. In some embodiments, the keywords do not need to be exact match and may be matched based on synonyms, semantic relationships, or other fuzzy matching.

The ranking of code snippets may be based on both the keywords entered by the user and also the features identified in, for example, step 501. In some embodiments, a match of a keyword increases a score of a result and the matching of features may also lead to a higher score. Code snippets may be ranked by score with higher scores indicating a higher rank and greater prominence in the search results. Ranking may be performed by the machine learning model 200.

The keywords associated with code snippets in code storage may be automatically extracted from codebases and code libraries. In one embodiment, an online community with code snippets and associated text is crawled, and the contents downloaded. The text is processed to extract keywords, where keywords may be identified due to their prominence in the text, such as their frequency of appearance, uncommonness in the corpus of documents, frequency of appearance in headings, titles, or summaries, and other methods. The extraction of keywords may be performed by using a machine learning model. The keywords may then be associated with the code snippet.

In one embodiment, the online community may be a question and answer community, such as Stack Overflow, where users post questions and receive answers. The answers may optionally include one or more code snippets. The text related to the answer or question may be parsed and processed to determine keywords to associate with the code snippet.

In other embodiments, keywords may be determined for a code snippet without associated natural language text. In some embodiments, the keywords may be generated automatically based on the code snippet and other code in the code base, without referring to external text. Moreover, keywords may also be generated based on documentation, such as docstrings, written in the source code itself. The text may be processed to extract keywords, where keywords may be identified due to their prominence in the text, such as their frequency of appearance, uncommonness in the corpus of documents, frequency of appearance in headings, titles, or summaries, and other methods. The extraction of keywords may be performed by using a machine learning model.

In other embodiments, keywords may be generated based on documentation stored in other parts of a codebase that are separate from code, such as in a documentation folder. Keywords may be extracted from this text using the same methods described above.

C. Keyword Snippet Generation

In an embodiment, code completion system 342 also includes the capability for keyword snippet generation. Instead of predicting a completion of code entered by the user, the code completion system 342 may generate a code snippet based on one or more keywords input by the user paired with the context. The code snippet may be entered into the code without necessarily completing any code entered by the user. The functionality may be similar to that in methods 500 and 520. However, the code completion system 342 generates the code snippet without attempting to complete code entered by the user. After entry of the keywords by the user, the system may use the keywords and the context to identify and rank relevant code snippets.

In an embodiment, method 400 may also be used for initiating keyword snippet generation. As set forth in method 400, an editor 302 is opened and source code file is loaded and displayed. The editor 302 responds to user inputs to modify the source file. Meanwhile, events are monitored or, alternatively, the code completion system 342 runs continuously. When it is determined from an event or from the continuous iteration of the code completion system 342 that keyword snippet generation should be performed, then a keyword snippet generation process may be performed.

In an embodiment, a variation of method 520 may also be used for keyword snippet generation. The method 520 would be modified such that it is performed based on keywords and context without performing a completion of user-entered code. One or more keywords are received from a user and other context may also be used, and the code completions are selected at least partly on the basis of the keywords and the context.

Figure 5C:
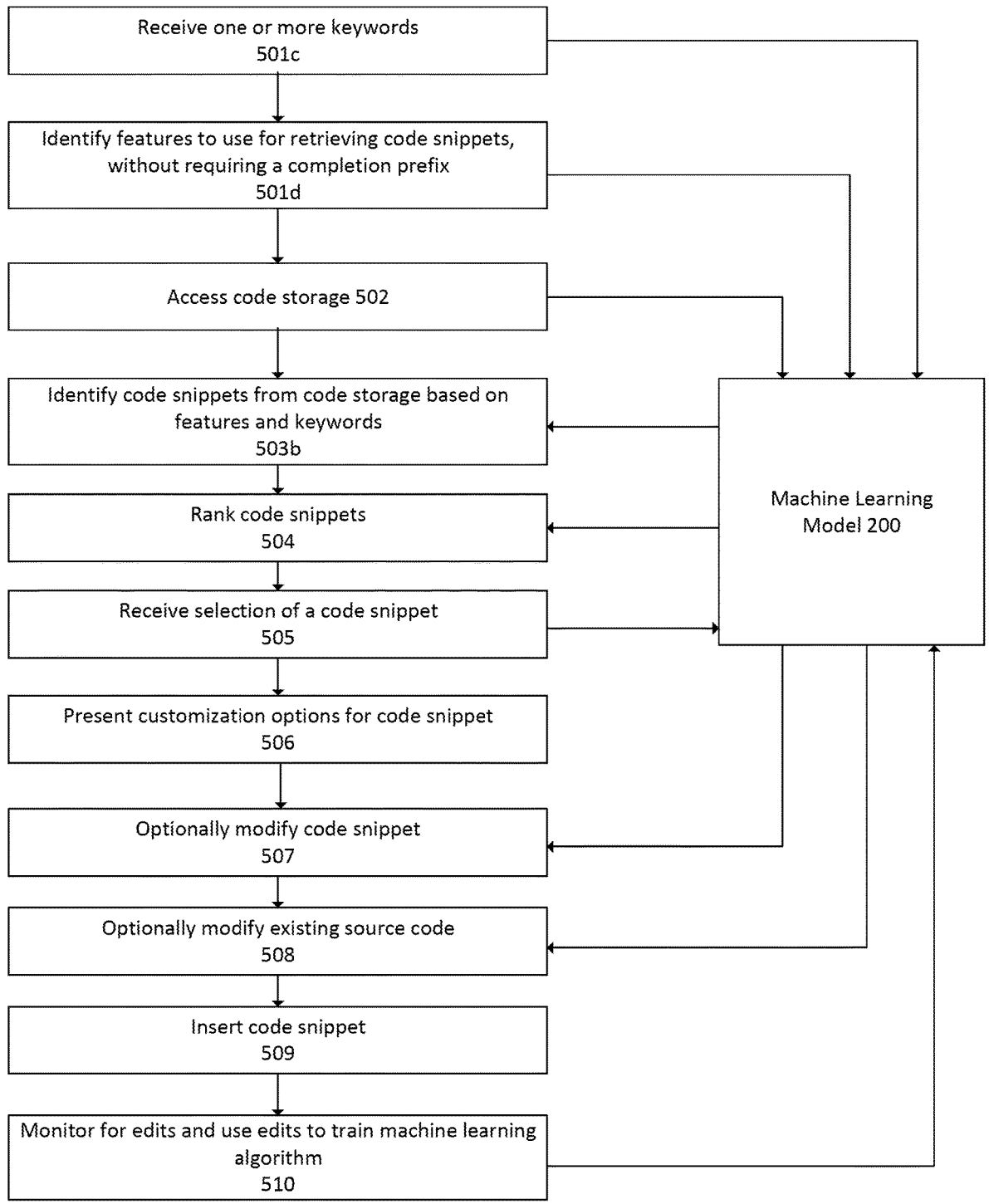
FIG. 5C illustrates an exemplary method for performing keyword snippet generation.

FIG. 5C illustrates an exemplary method 540 for keyword snippet generation. Method 540 shares many of the same steps as method 520. It differs in that steps 501c and 501d have been added to receive one or more keywords and identify features to use for retrieving code snippets without requiring a completion. In step 501*c*, keywords may be received from the user. In one embodiment, the keywords may be received in the regular code editor 302 in the same interface elements as regular code from the user. For example, a code component 802 may accept both the regular code entered by the user and also keywords entered for keyword snippet generation. In an alternative embodiment, the user interface 304 may include a text box or other user interface for receiving a search string of keywords that is separate from the code component 802. The keywords may be received in a direct or indirect manner. When received in an indirect manner, the keywords may be derived from other information rather than direct entry by the user. In one embodiment, the keywords may comprise words in code comments that are near the cursor. In one embodiment, the keywords may comprise the text of a function name, such as a function definition "def getHttpResponse" being converted to keywords "get http response." In one embodiment, the keywords received are natural language keywords such as "make HTTP request." In one embodiment, the keywords received are natural language keywords having programming code syntax such as "makeHTTPRequest" or "make_http_request." It may be desirable to allow the system to detect when the user does not know an exact entity name, such as for a variable or function, and is approximating it with natural language that looks like code. In an embodiment, the system may parse the keywords by splitting them into takens based on interpreting the keywords using programming syntax. For example, the system may split tokens on underscores or at the change from lower case to uppercase in camel case syntax. In some embodiments, the keywords received may be pseudocode keywords. In one embodiment, the keywords entered by the user may apply to more than one interaction. For example, the keywords may apply to future interactions and code snippet generations for a set period of time or a set number of interactions.

In step 501*d*, the code completion system 342 may analyze or identify a set of features to determine code snippets to retrieve to offer as generated code snippets. The step 501*d* may be performed without requiring a code completion prefix and instead based on other context. Features may be related to the context around the location of the keywords, when the keywords are entered in the editor, or the cursor. Features that may be used include the current cursor position or position of the keywords in editor 302, the token immediately preceding the keywords or cursor, a most recent token or a plurality of recent tokens typed by the programmer, a plurality of tokens preceding the keywords or cursor or succeeding the keywords or cursor, tokens on the same line as the keywords or cursor, tokens on a set of preceding lines of the keywords or cursor or on succeeding lines of the keywords or cursor, lines of code before or after the keywords or cursor, an identifier of the current function that the keywords or cursor is located in, identifiers located near the keywords or cursor, the code located near the keywords or cursor, code located in the same function as the keywords or cursor, the most recent code typed by the programmer, and other features. In an embodiment, the features are used as inputs to a machine learning model 200 in later steps in order to perform prediction.

In steps 502-510, as described elsewhere herein, the keywords and features may be used to generate code snippets to be presented to the user for insertion. At step 503*b*, the code completion system 342 identifies relevant code snippets from code storage based on features, in the same manner as in step 503. However, in step 503*b*, the code completion system identifies relevant code snippets based on both the features of the code context that were identified and also the keywords that were received from the user in step 501*c*. Also, rather than identifying relevant code snippets from code storage, the code completion system 342 may instead generate the code snippet on the fly by using machine learning. When the code snippet is identified or generated, both the features of the code context and the keywords may be inputs to the machine learning model 200 that performs the inference and returns the result.

In embodiments, the code snippets may have one or more associated keyword tags through which the search and retrieval may in part be performed. Methods of associating keywords with code snippets are described elsewhere herein.

D. Ranking

Ranking of code snippets relates to the way that code snippets are presented to the user. Ranking may be used to determine a sequential order in which code snippets are presented to the user, such as top to bottom or left to right. In some embodiments, ranking is performed by assigning a score to code snippets and displaying higher scoring code snippets before lower scoring code snippets. Ranking may be implemented by applying machine learning model 200.

A ranking algorithm may be used that incorporates one or several ranking factors. In one embodiment, one of the factors used in ranking is which code storage location the code snippet appears in. In one embodiment, personal code storage is scored the most highly, team code storage is scored the second mostly highly, and external code storage is scored the least highly. In an embodiment, code snippets are scored based on the number of occurrences or the context of occurrence in different codebases. For example, in an embodiment, the appearance of a code snippet in several different codebases, related to different projects, increases its score. Moreover, a code snippet appearing in a more commonly downloaded, used, or reputationally-scored codebase may increase the score of the code snippet. In further embodiments, a code snippet may be scored based on the code surrounding the programmer's current cursor position. For example, code snippets may be scored based on appearing in a similar context in their codebase or usage context or may be scored based on having similar code to the programmer's current cursor position. In further embodiments, a code snippet may be scored based on click data, such as how often the code snippet has been selected by users. The click data may be specific to the current user or may be across a group or all users.

In some embodiments, the factors used in ranking may account for expected payoff if the programmer selects the completion. For example, a code snippet that is longer could save the programmer more time than a code snippet that is shorter. Also, a code snippet that is more complex could save the programmer more time than a code snippet that is less complex. Code snippets that have higher expected payoff may receive a higher score than code snippets that have a lower expected payoff.

E. Indexing Methods

In some embodiments, the typing of the user is processed by smart indexing methods, in order to allow for completions and prediction even in the face of incomplete or incorrect text from the user. Smart indexing may be implemented by machine learning models such as rule-based or learning algorithms. In an embodiment, fuzzy matching may be used to map a term such as "Error" to "ValueError." Fuzzy matching may be implemented by algorithms that find similar terms that differ one or more places. For example, edit distance may be used for fuzzy matching. In an embodiment, a learning algorithm may be applied to learn the fuzzy matching function to map from incomplete or incorrect text to complete text. The co-pilot system 340 may monitor user actions and observe that the user enters an initial text, such as "Error," and later changes that revised text to "ValueError." Based on the training data comprising the time series data from the user, the system may learn the association between the initial text and revised text.

In an embodiment, the code completion system 342 is typo resilient. For example, a term like "Eror" is automatically mapped to "Error." The typos resilience may be based on hard-coded rules or may be based on a machine learning system that learns the associations between typos and their corrections. For example, the machine learning system may be trained by providing examples of tokens or multi-token phrases with an error and the corresponding correction. In this manner, the machine learning system may learn an association between an incorrectly typed statement and a correct statement.

In an embodiment, the code completion searches for completions more than one level deep in a hierarchy. Some entities in code are hierarchical. In some embodiments, the code completion system 342 searches for entities for completion by skipping to one or more further levels and not searching just at the current level. For example, the user typing "django.CharField" may cause the code completion system 342 to identify "django.db.charField" as a completion even though CharField is one level further down in the hierarchy than the user had typed. In some embodiments, the code completion system search two or more levels deep, three or more levels deep, four or more levels deep, and so on. The associations between an entity and further entities that are more than one level down may also be learned by monitoring user data. For example, the system may observe an initial entry of text that is incorrect and incomplete and a later revision by the user. The system may use machine learning to learn the association between the initially entered text and the completed text.

F. Predictive Edits

In some embodiments, the predictive editing system 342 includes the ability to make predictive edits. In some embodiments, these are suggestions for automatic refactoring of code that are presented to a user. In particular, as a programmer edits code, it may be necessary to refactor code to be consistent with the newly made edits. The predictive editing system 344 may automatically detect the user has made a change requiring refactoring and suggest the correct refactoring.

Figure 6A:
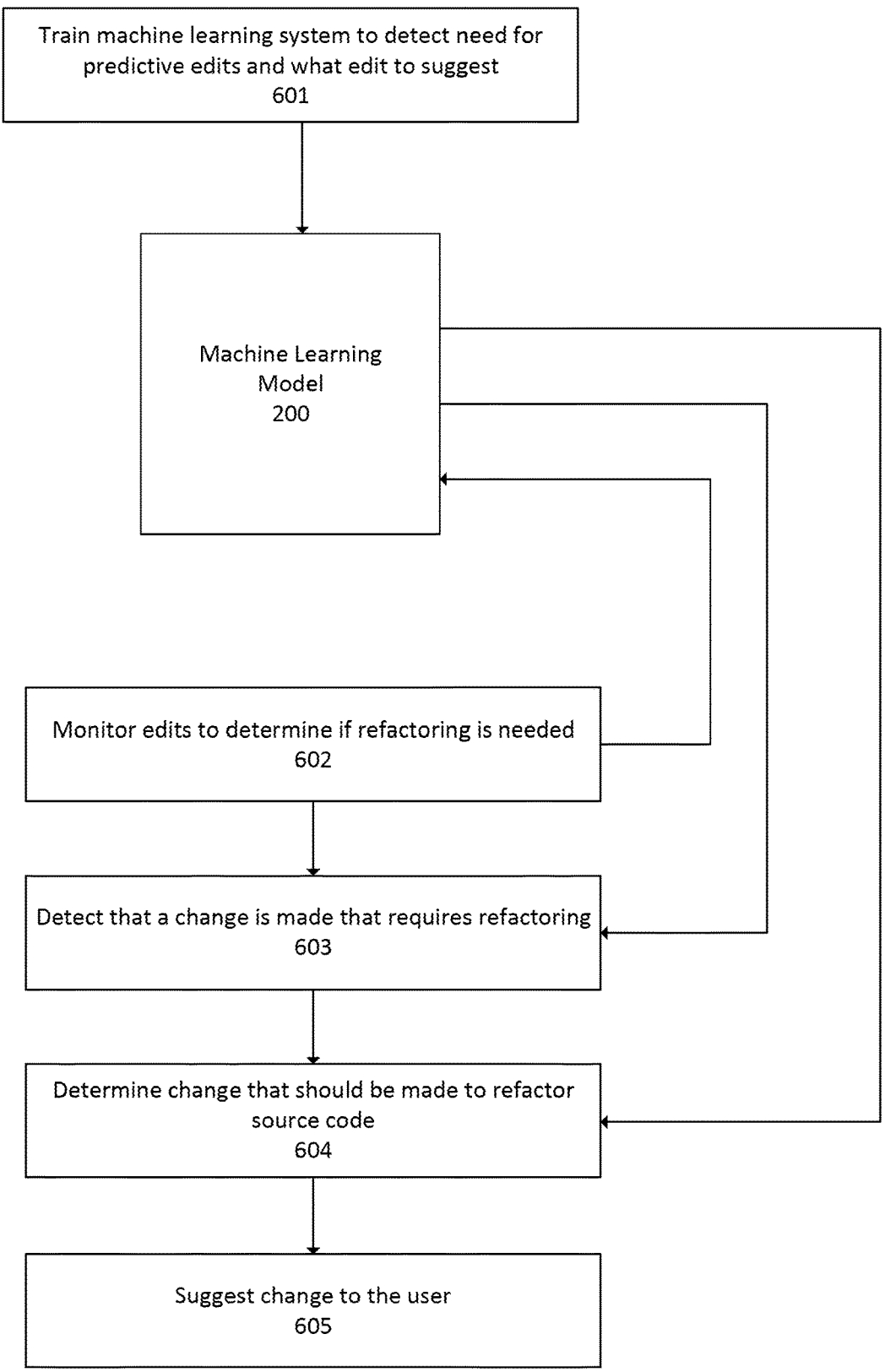
FIG. 6A illustrates an exemplary method for predictive editing.

FIG. 6A illustrates an exemplary method 600 for predictive edits. In step 601, a machine learning system 200 is trained to detect the need for predictive edits and what edit to suggest. In an embodiment, training data is collected by monitoring programmer edits in the editor 302. As the programmer makes changes to the source code, the programmer's future changes to the source code are also monitored. These examples of initial changes to code leading to future changes in the code may comprise training examples of how an initial change of code implies changes that must be made to other parts of the code. The training examples are used to train the machine learning system to learn to identify code changes that require refactoring and to learn the appropriate refactoring that is required.

In step 602, edits made in the editor 302 are monitored by the machine learning system 200 to determine if an edit is made that requires refactoring. In step 603, the machine learning system 200 detects that a change is made that requires refactoring. In step 604, the machine learning system 200 determines the change that should be made to refactor the source code. In some embodiments, the machine learning system 200 may identify a plurality of potential changes that may be made to the code and rank them for selection by the user. In step 605, the predictive editing system 344 suggests the change or changes to the user. Upon selection by the user, the change may be performed. In some embodiments, the machine learning system 200 also generates a confidence value representing the confidence that the machine learning system 200 has in the refactoring. The confidence value may optionally be displayed to the user. In some embodiments, the system includes a threshold, which when exceeded, leads to refactoring automatically being performed. The confidence value of the machine learning system 200 may be compared to the threshold, and, if the threshold is exceeded, then the system may automatically perform the refactoring without requiring acceptance by the user. If there are multiple potential changes to suggest, then the machine learning system 200 may rank the changes based on their confidence values.

In one embodiment, the automatic refactoring that is detected is the renaming of a symbol, such as an identifier of a variable, function, class, or other entity. The predictive editing system 344 may determine that additional instances of the symbol in the source code should be renamed according to how the user has renamed the symbol. In one embodiment, the renaming of a symbol may take place across different files in a codebase, even where the files are of different types and written in different programming languages. For example, in one embodiment, the user changing a class name of an HTML element in an HTML file may cause the system to suggest a change to the class name in a corresponding CSS file.

In one embodiment, the automatic refactoring that is detected is the changing of the directory structure such as by moving or more files in the programming environment. The predictive editing system 344 may determine that one or more file paths in the source code 310 must be changed to correspond to the new directory structure.

Figure 6B:
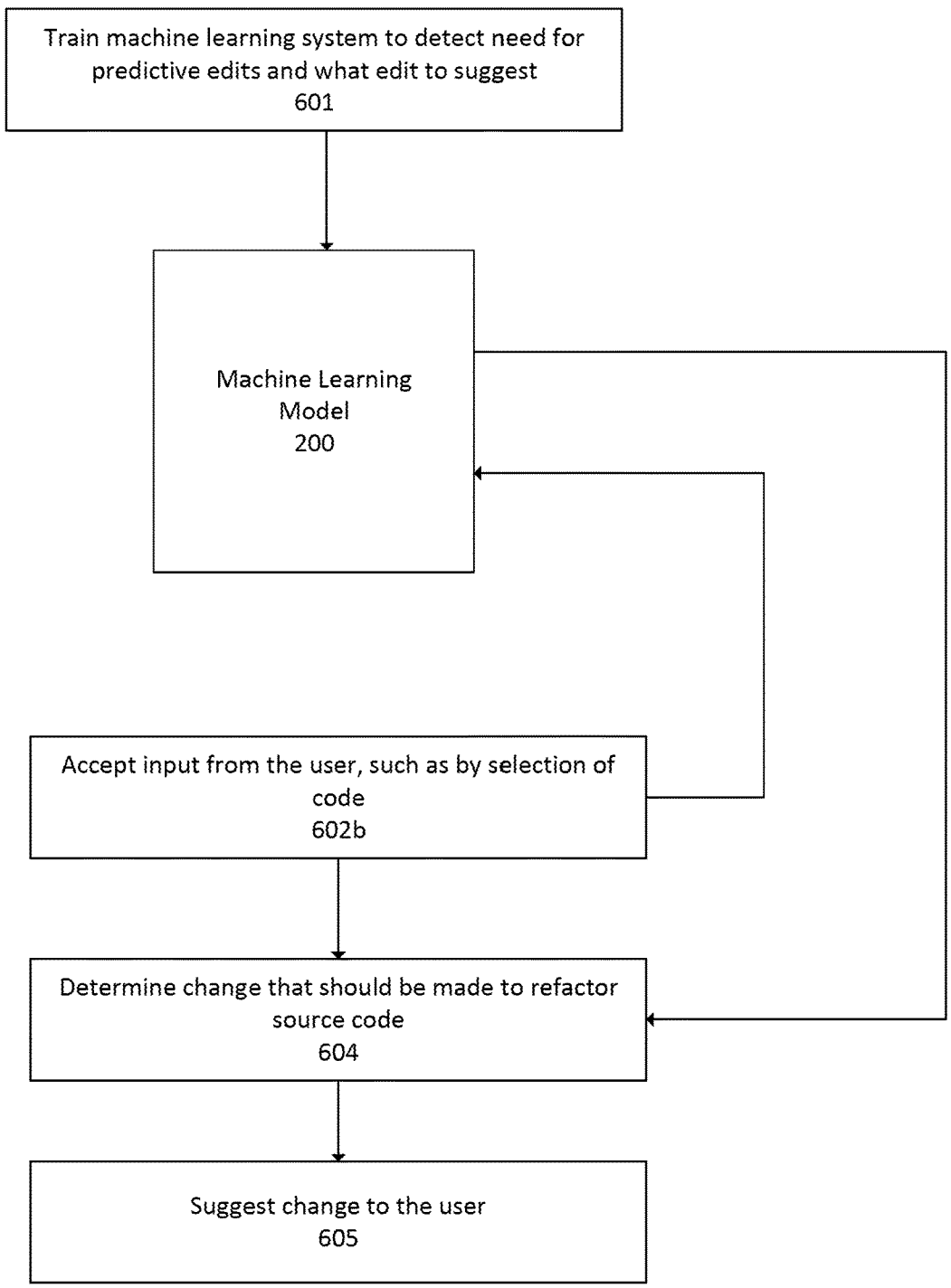
FIG. 6B illustrates another exemplary method for predictive editing.

FIG. 6B illustrates a method 610 for predictive edits. Method 610 comprises several of the same steps as method 600. However, in step 602b, input from the user is accepted in form of selection of one or more tokens or lines of code. The selection may be in the form of drag and select, hover, or other methods. The editor 302 may display a set of options of changes that a user can make such as refactoring the code into a function or a list comprehension. The selection from the user may be input to the machine learning model 200 to perform inference. Upon user selection of one of the choices for refactoring, the correct refactoring is determined in step 604 by machine learning model 200. The resulting change is presented to the user, or automatically implemented, in step 605.

Optionally, in some embodiments, a user input field may be presented to the user where the user may enter one or more keywords. The user may enter one or more keywords that express an intent to the programming environment about the refactoring that is desired. The predictive editing system 344 may determine the change that is intended based on the keywords and determine the correct refactoring to perform. The keywords may be used to help the code completion system determine the refactoring that is desired

G. Predictive Navigation

In some embodiments, the predictive navigation system 346 includes the ability to predict and suggest navigation of the user in the source code. As a programmer codes, it is often necessary for the programmer to make corresponding changes in another file or another section of the same file. The predictive navigation system 346 may automatically detect that the programmer has performed an action that suggests the programmer will want to navigate and may automatically suggest the correct navigation.

Figure 7:
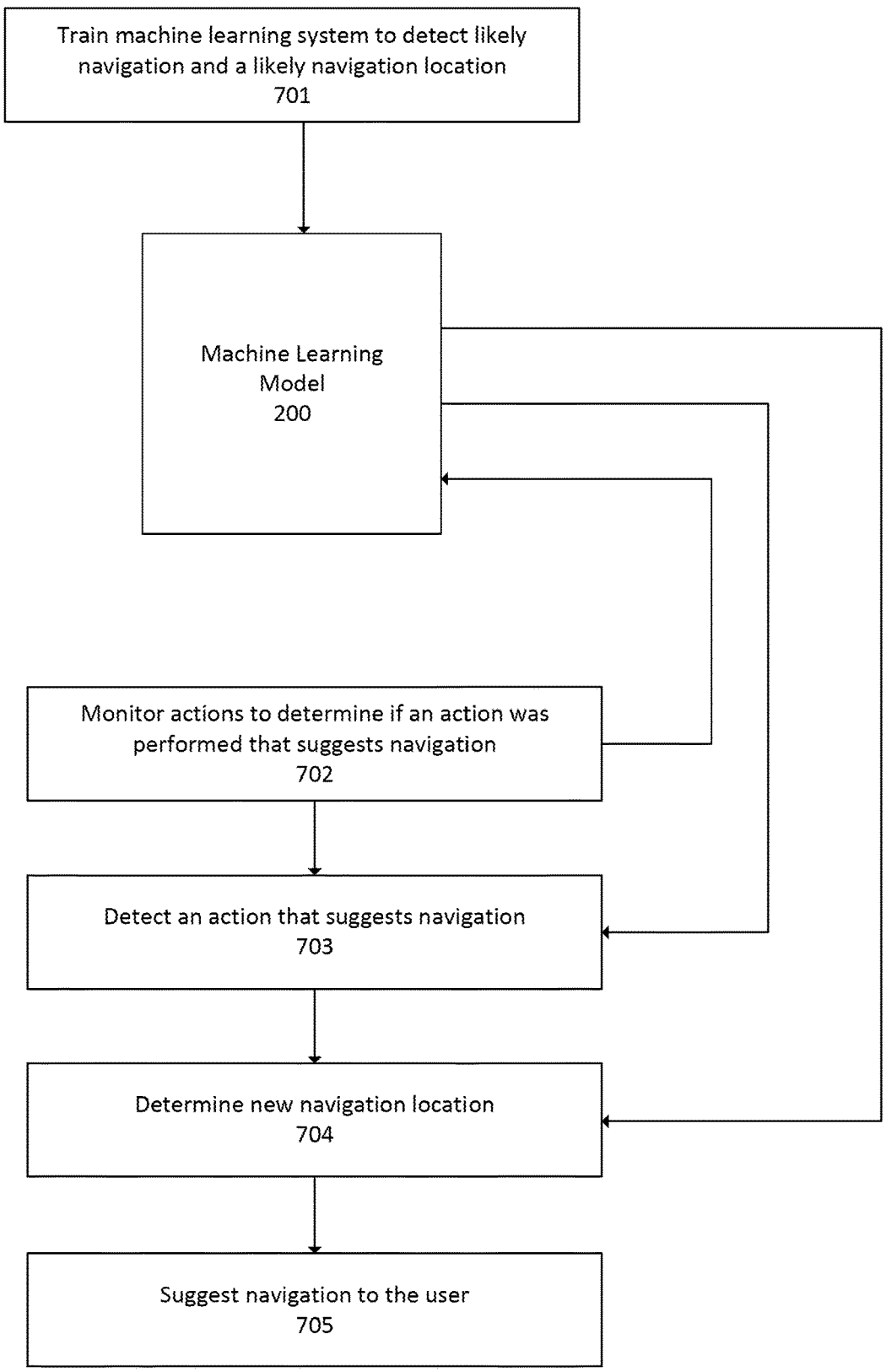
FIG. 7 illustrates an exemplary method for predictive navigation.

FIG. 7 illustrates an exemplary method 700 for predictive navigation. In step 701, a machine learning system 200 is trained to detect a likely navigation and what the likely navigation location is. In an embodiment, training data is collected by monitoring programmer edits in the editor 302. As the programmer performs actions in the source code, the programmer's future navigation in the source code files is also monitored. These examples of actions in the code leading to future navigation in the code may comprise training examples of how an initial action in the code leads to future navigation. The training examples are used to train the machine learning system 200 to learn to identify actions that lead to navigation and learn the desired navigation.

Actions in the code that may be monitored for connection to navigation may include editing code, moving the cursor, the cursor location, the type of symbol or token under the cursor, where the user most recently typed, what code the user recently highlighted, or what navigation actions the user recently performed.

In step 702, actions performed in the editor 302 are monitored by the machine learning system 200 to determine if an action was performed that suggests navigation. In step 703, the machine learning system 200 detects that an action was performed that suggests navigation. The detection may be based on inference as a result of actions performed by the user. In step 704, the machine learning system 200 determines the new location to which the programmer should be navigated. In step 705, the predictive navigation system 346 suggests the navigation to the user. In some embodiments, a plurality of navigation targets could be suggested to the user in a list or menu. Upon selection of a navigation target, the system 346 may perform the navigation. In some embodiments, the machine learning system also generates a confidence value representing the confidence that the machine learning system has in the upcoming navigation. The confidence value may optionally be displayed to the user. In some embodiments, the system includes a threshold, which when exceeded, leads to navigation automatically being performed, where the system automatically navigates the user to a new location. The confidence value of the machine learning system may be compared to the threshold, and, if the threshold is exceeded, then the system may automatically perform the navigation without requiring acceptance by the user.

Navigation may include opening a new file and placing the user's cursor at a location in new file. It may also include moving the user's cursor in the current file. In some embodiments, the new navigation target is opened in a new panel, tab, or window.

In one embodiment, the predictive navigation system 346 may predict navigation as a result of the user adding a new entity. For example, in an embodiment, the predictive navigation system 346 detects that the user has added a new HTML element with a new class name, and then predict as a result that the user would want to navigate to the bottom of a CSS file corresponding to the HTML file, in order to add styling for the new HTML element class.

In another embodiment, the predictive navigation system 346 may detect user has performed many navigation actions and then predict that user would to perform another navigation action. For example, the predictive navigation system 346 may detect that the user has performed several "Go To Definitions" to go to the definition associated with an identifier. Then, in response to the user clicking on an identifier, such as type name, variable name, class name, or function name, the predictive navigation system 346 may determine that the user wants to navigate to the definition of that type.

Optionally, in some embodiments, a user input field may be presented to the user where the user may enter keywords indicative of a desired intent. The code completion system may analyze the keywords entered by the user to determine the user's desire, and may determine that the user wants to perform a navigation action. For example, in response to an entry such as "add a new CSS class and navigate to it," the system may create code to instantiate a CSS class and also navigate the user to the new class.

H. User Interface

Figure 8A:
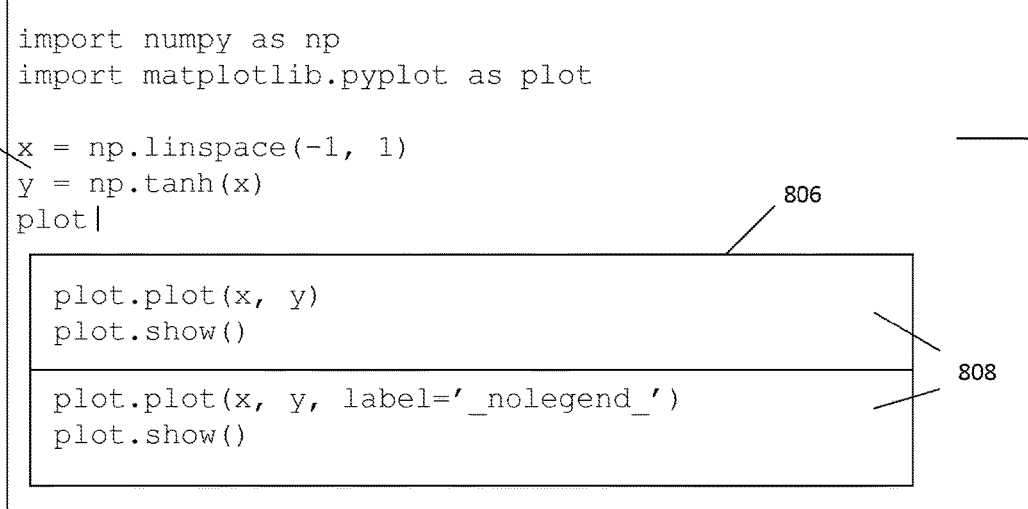
FIG. 8A illustrates an exemplary user interface that may be used in some embodiments.

FIG. 8A illustrates an exemplary interface 304 of an editor 302 for presenting a list for code completion. A user interface 800 is illustrated and includes code component 802 that displays code 804 and a code completion interface component 806 that displays a plurality of code snippets 808 to the user for code completion. In this example, the code snippets are multi-token code snippets. Interface elements may allow a code snippet to be selected by a user, such as by tapping, clicking, typing, voice commands, or other user interactions. In an embodiment, the code completion system 342 may highlight differences in the code snippets to allow easier viewing of small differences in code snippets. For example, the difference between code snippets 808 may be highlighted to show that one code snippet includes label='_nolegend_' and the other does not. Highlighting may be shown by any method of showing attention such as changing text color, background color, font size, bolding, or so on.

Figure 8B:
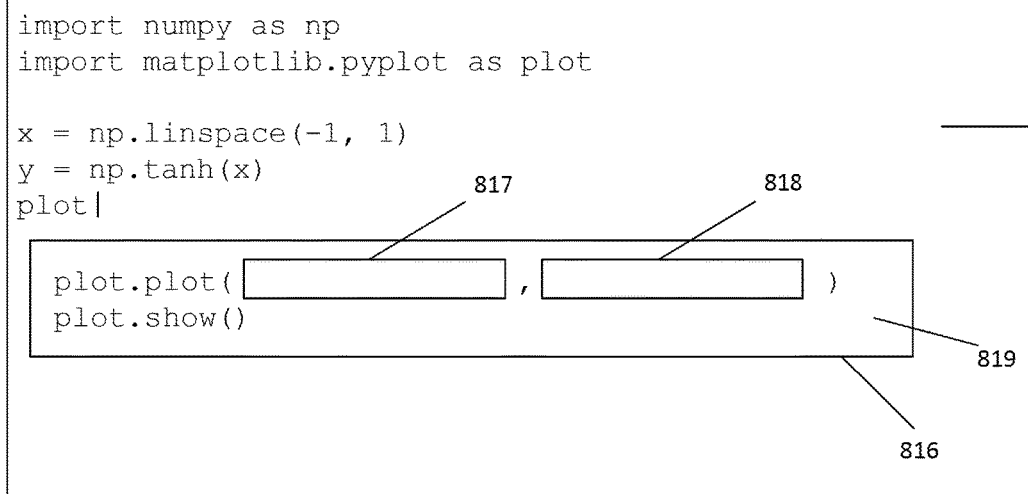
FIG. 8B illustrates an exemplary user interface that may be used in some embodiments.

FIG. 8B illustrates user interface 810 for presenting code completions that accept additional user input for customization. In this example, a code snippet has been selected by a user. The code snippet 819 is displayed in code completion interface component 816. In this example, the candidate code completion is a multi-token completion and includes blanks 817, 818 for filling in template variables. The blanks may also be referred to as gaps or holes. The code snippet 819 is visually presented to the user in a manner to identify and highlight the blanks available to fill in. In response to user selection of one of the blanks, the user may presented with a user interface element for entering the value for the blank. The interface element may be, for example, a drop-down menu with one or more options to fill the blank or a text entry field for receiving free text typing. In an embodiment, the user interface element for filling in the blanks is distinct from a normal text editing mode. The user interface element may be different than entering code in the code component 812 where the rest of the source code is entered. That is, a different user interface other than the code component 812 may be used for filling in the blanks.

In some embodiments, selection or completion of one of the blanks causes an autocompletion or suggestion to be shown for a different blank, such as a subsequent or preceding blank. For example, completing blank 817 with the variable X5 may cause the code completion system 342 to recognize that blank 818 should be completed with variable Y5. In response, to this determination, the code completion system 342 may automatically populate the blank 818 with the determined value. In other embodiments, the determined value may be presented to the programmer as a suggested option. After the selection or confirmation by the user, then the blank 818 is filled in with the value.

Figure 8C:
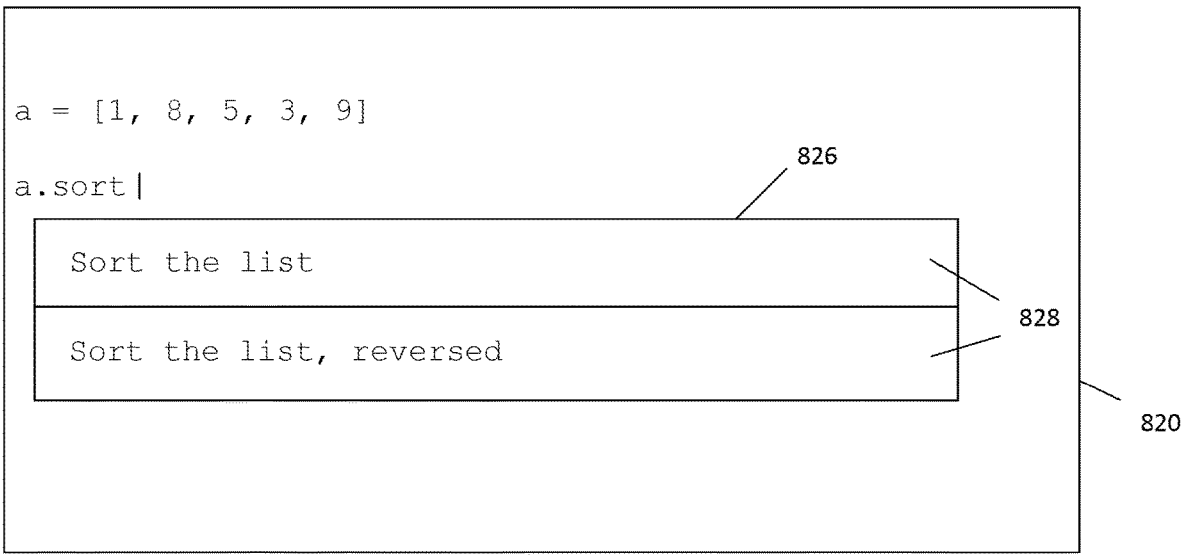
FIG. 8C illustrates an exemplary user interface that may be used in some embodiments.

FIG. 8C illustrates an exemplary user interface 820 for presenting code completion options using natural language. A code completion interface component 826 is illustrated containing multiple options for code completions 828, which are presented in natural language. After receiving a selection from the user, a code snippet corresponding to the natural language description may be selected and inserted into the programmer's code. In other embodiments, after selection, another list is shown of actual code snippets corresponding to the natural language text. For example, there may be several code snippets available that accomplish the same described text. A selection may be received from the user in the new list, and the selected code snippet may be inserted.

Embodiments may display code snippets in different ways. In one embodiment, code snippets that span multiple lines ("multi-line code snippets") are shown across multiple lines, for example, in the manner that they would be displayed in the editor. In some embodiments, multi-line code snippets may be displayed on a single line and have characters shown to denote the new lines. This may be easier for viewing and understanding in some cases. In some embodiments, the multi-line code snippet may be come long if it is displayed on a single line. Extra new lines may be inserted at determined locations to make the code snippet easier to read, particularly if the display component is narrower than the width of the code snippet. This may be referred to as a smart wrap feature.

Figure 8D:
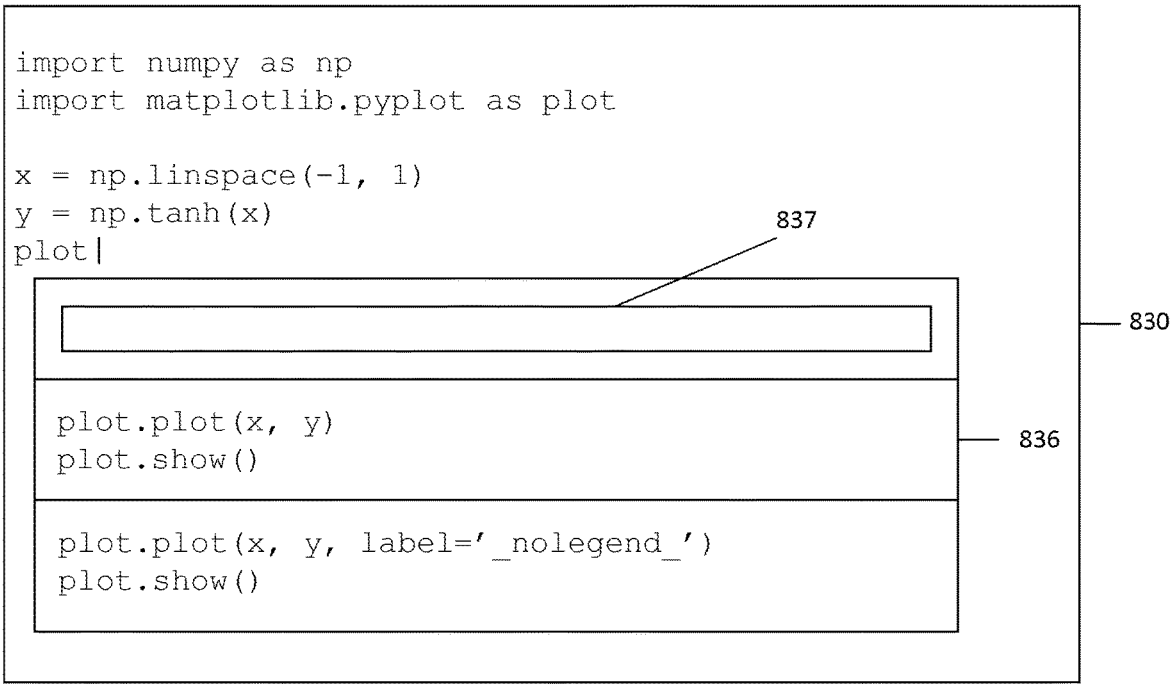
FIG. 8D illustrates an exemplary user interface that may be used in some embodiments.

FIG. 8D illustrates an exemplary user interface 830 for presenting keyword-driven completions. A code completion interface component 836 is illustrated that includes a text field 837 for entering one or more keywords for a search and may optionally include one or more options for completion. The user may enter keywords in the text field 837, and the system may perform a keyword-driven query based on both the code in the editor 302 and the keyword.

In other embodiments, the code completion system 342 may have one or more pre-defined strings that trigger turning the editor 302 into keyword-driven completion. In one embodiment, the user types "////" in a C++ programming environment, and the following tokens are treated as input for keyword-driven completion. In an embodiment, the code completion system 342 monitors the tokens input by the user to detect the pre-defined string. Upon detecting the pre-defined string, the code completion system 342 switches to keyword-driven completion mode.

FIG. 8E illustrates user interface 840 for keyword snippet generation. In this example, one or more keywords 841 have been received from the user in the code component 842. The keywords 841 are natural language keywords written in a code-like syntax. Alternatively, they could be natural language written in a human language syntax such as "graph x and y" or in pseudo code. Based on the keywords 841 and context, a code snippet interface component 846 displays a plurality of code snippets 848 to the user for entering into the editor. In some embodiments, the code snippets 848 may have blanks for template variables such has blanks 817, 818 in interface 810. In one embodiment, the keywords 841 are received in a text box, such as a search query field, instead of in the code component 842.

FIG. 8F illustrates user interface 850 for code completion with indented completions. Indented completions may be used when multiple code snippets are retrieved that share some tokens in common and differ in other tokens. In some embodiments, the shared tokens are a prefix that is common among the multiple code snippets. The shared tokens may be grouped together into a common string that is displayed to the user and the tokens that differ between code snippets may be shown in indented lines beneath the common string. The indents may be shown with ellipses (e.g., " . . . "), with white space, or with other characters. In some embodiments, the common string may comprise a function or variable name. In some embodiments, the indented code completions may comprise different variables or arguments to pass to the function. In exemplary user interface 850, user code 851 is received in the code component. A plurality of relevant code snippets are retrieved, such as plot.plot(x, y), plot.plot(x, y, label='_nolegend_'), and plot.plot(x, y, color='red'). Each of these code snippets is a code completion with the same function name, but they differ in the arguments passed to the function. Therefore, a common string is displayed with the function name plot.plot 852 and the potential indented completions 853, 854, 855 are shown indented under the function name. Each of the indented completions is selectable for the user to select the particular completion including both the common string and the indented completion. For example, upon receiving a selection of indented completion 853, the system may input the completion plot.plot(x, y) into the editor.

FIG. 8G illustrates user interface 860 for keyword snippet generation using natural language. In this example, one or more keywords 861 have been received from the user in the code component 862. The keywords 861 are natural language keywords written in a code-like syntax. Alternatively, they could be natural language written in a human language syntax such as "graph x and y" or in pseudo code. Based on the keywords 861 and context, a code snippet interface component 846 displays a plurality of natural language phrases 868 to the user for entering into the editor. A code completion interface component 866 is illustrated containing multiple options for generated code snippets 868, which are presented in natural language. After receiving a selection from the user, a code snippet corresponding to the natural language description may be selected and inserted into the programmer's code. In other embodiments, after selection, another list is shown of actual code snippets corresponding to the natural language text. For example, there may be several code snippets available that accomplish the same described text. A selection may be received from the user in the new list, and the selected code snippet may be inserted.

FIG. 8H illustrates interface 860 for keyword snippet generation using natural language with indented completions. Indented completions may be used when multiple natural language options are retrieved that share some tokens in common and differ in other tokens. In some embodiments, the shared tokens are a prefix that is common among the multiple natural language options. The shared tokens may be grouped together into a common string that is displayed to the user and the tokens that differ between natural language options may be shown in indented lines beneath the common string. The indents may be shown with ellipses (e.g., " . . . "), with white space, or with other characters. In some embodiments, the common string may comprise a function or variable name. In some embodiments, the indented code completions may comprise different variables or arguments to pass to the function. In exemplary user interface 870, user code 871 is received in the code component. A plurality of relevant natural language options are retrieved such as "Plot graph of x and y," "Plot graph of x and y without a legend," and "Plot graph of y and x." Each of these natural language options relates to plotting a graph. Therefore, a common string 872 is displayed and the potential indented completions 873, 874, 875 are shown indented under the common string 872. Each of the indented completions is selectable for the user to select the particular completion including both the common string and the indented completion. For example, upon receiving a selection of indented completion 873, the system may recognize the selection "Plot graph of x and y" and insert an associated code snippet.

FIG. 8I illustrates an interface for code completion where a code snippet is inserted or a modification is made at a location other than the location of the cursor. Code 884 has been entered by the user and a code completion interface 886 is displayed with a plurality of code snippets 888 for potential completions. After the user selects one of the completions, the code completion system 342 determines that library matplotlib.pyplot is missing and is needed for the code in the completion to be functional. Therefore, it determines that code snippet 885 is needed, and the code completion system 342 inserts the code at the top of the source code in the editor.

FIG. 8J illustrates a shell, terminal, or operating command line 890 where code completion system 342 may operate. All of the functionality described herein applies to shells, terminals, and command lines. Code 894 is received on the command line. A code completion interface 896 is displayed with a plurality of potential code completions 898. Upon selection, the selected code completion may be added to the shell and, optionally, executed.

Figure 9:
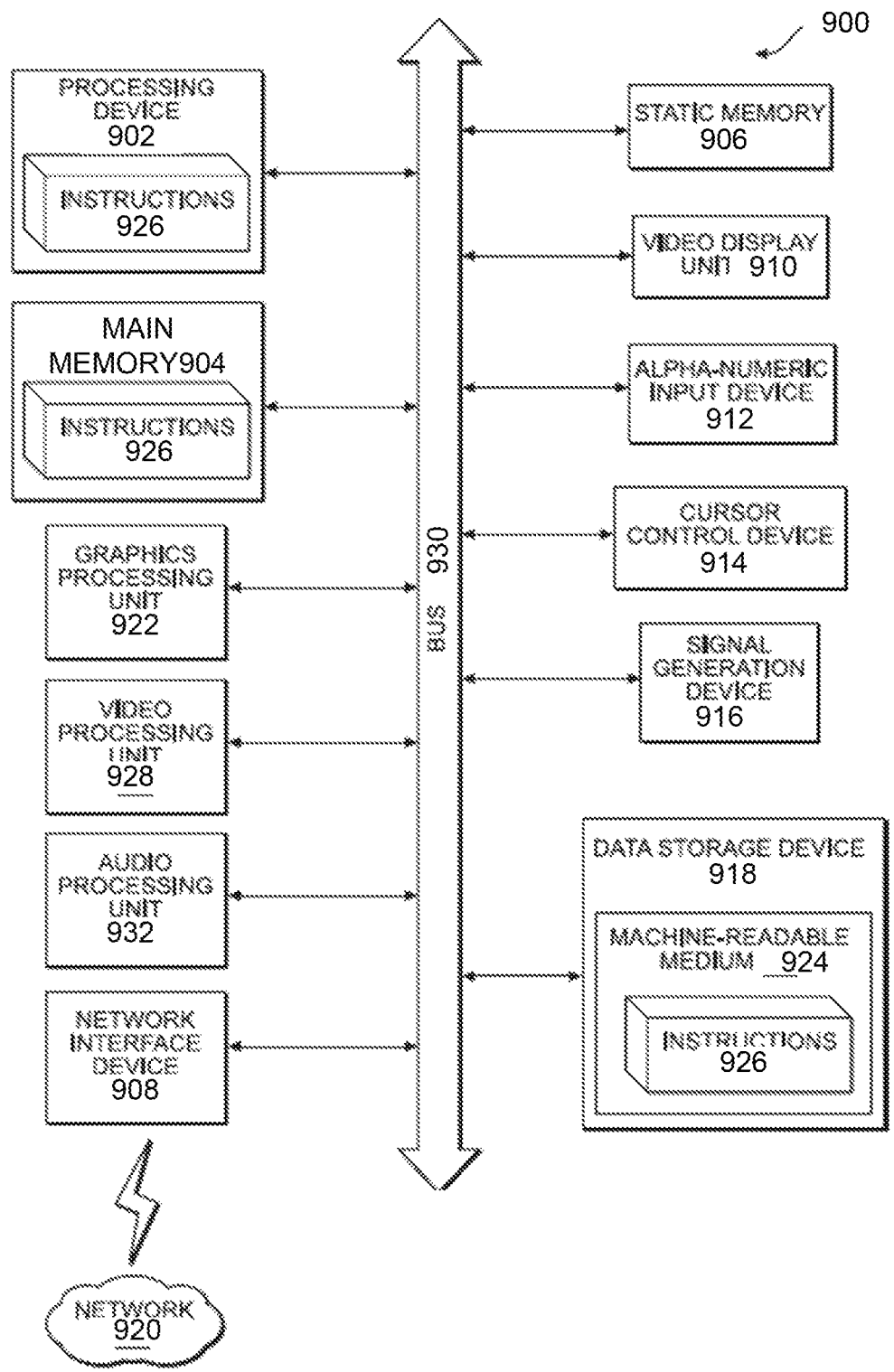
FIG. 9 illustrates an example computer system for performing some methods herein.

FIG. 9 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930.

Processing device 902 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute instructions 926 for performing the operations and steps discussed herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 915 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a computer-readable medium) on which is stored one or more sets of instructions or software 926 embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In one implementation, the instructions 926 include instructions to implement functionality corresponding to the components of a device to perform the disclosure herein. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

It will be appreciated that the present disclosure may include any one and up to all of the following examples.

Example 1: A computer-implemented method comprising: receiving edits at a cursor location in a code editor from a programmer; updating source code at the cursor location in response to the edits received from the programmer; detecting an event to trigger code completion; determining features of the source code near the cursor location, wherein the features include one or more tokens near the cursor location; using the features to search for code snippets in a team or local data set or to generate code snippets based on one or more models trained using the team or local data set;

identifying or generating one or more candidate code snippets; displaying the one or more candidate code snippets to the programmer; receiving a selection of one of the candidate code snippets; inputting the selected code snippet into the source code.

Example 2: The computer-implemented method of Example 1, further comprising: wherein the selected code snippet includes one or more blanks for filling in template variables and a user interface element is displayed for filling in the blanks, distinct from a normal text editing mode; receiving user input in the user interface element and filling in the blanks.

Example 3: The computer-implemented method of Example 2, further comprising: filling one of the blanks with a second code snippet, the second code snippet further including a second set of blanks for filling in a second set of template variables; displaying a second user interface element for filling in the second set of blanks, distinct from a normal text editing mode; receiving user input in the second user interface element for filling in the second set of blanks.

Example 4: The computer-implemented method of Example 1, further comprising: ranking the one or more candidate code snippets according to a score; wherein the score is based at least on a calculation of relevance.

Example 5: The computer-implemented method of Example 4, wherein the calculation of relevance is based at least in part on one or more features of tokens near the cursor location.

Example 6: The computer-implemented method of Example 1, wherein using the features to search for or generate code snippets comprises inputting the features into a neural network and receiving an output from the neural network.

Example 7: The computer-implemented method of Example 6, wherein the neural network comprises a graph neural network.

Example 8: The computer-implemented method of Example 1, wherein using the features to search for or generate code snippets comprises using a lexical language model.

Example 9: The computer-implemented method of Example 1, wherein using the features to generate code snippets comprises using beam search.

Example 10: The computer-implemented method of Example 1, wherein the event is detecting that the programmer has finished typing.

Example 11: The computer-implemented method of Example 1, wherein one or more of the candidate code snippets is a multi-token code snippet.

Example 12: The computer-implemented method of Example 1, wherein each of the candidate code snippets includes a set of one or more associated keywords, the one or more associated keywords determined by analyzing one or more external codebases.

Example 13: The computer-implemented method of Example 1, wherein the selected candidate code snippet includes whitespace, and the whitespace is customized according to one or more inferred parameters from a codebase of the programmer.

Example 14: The computer-implemented method of Example 1, wherein the selected candidate code snippet includes whitespace, and the whitespace is customized according to one or more rules that are set in a development environment.

Example 15: A computer-implemented method comprising: receiving edits at a cursor location in a code editor from a programmer; updating source code at the cursor location in response to the edits received from the programmer; detecting an event to trigger code completion; determining features of the source code near the cursor location, wherein the features include one or more tokens near the cursor location; using the features to search for code snippets in a data set or to generate code snippets based on one or more models trained using the data set; identifying or generating one or more candidate code snippets, wherein the one or more candidate code snippets are multi-token code snippets and the candidate code snippets contain content, the content of the candidate code snippets being adapted to a source code context at the cursor location; displaying the one or more candidate code snippets to the programmer; receiving a selection of one of the candidate code snippets; inputting the selected code snippet into the source code.

Example 16: The computer-implemented method of Example 15, further comprising: wherein the selected code snippet includes one or more blanks for filling in template variables and a user interface element is displayed for filling in the blanks, distinct from a normal text editing mode; receiving user input in the user interface element and filling in the blanks.

Example 17: The computer-implemented method of Example 16, further comprising: filling one of the blanks with a second code snippet, the second code snippet further including a second set of blanks for filling in a second set of template variables; displaying a second user interface element for filling in the second set of blanks, distinct from a normal text editing mode; receiving user input in the second user interface element for filling in the second set of blanks.

Example 18: The computer-implemented method of Example 15, further comprising: ranking the one or more candidate code snippets according to a score; wherein the score is based at least on a calculation of relevance.

Example 19: The computer-implemented method of Example 18, wherein the calculation of relevance is based at least in part on one or more features of tokens near the cursor location.

Example 20: The computer-implemented method of Example 15, wherein using the features to search for or generate code snippets comprises inputting the features into a neural network and receiving an output from the neural network.

Example 21: The computer-implemented method of Example 20, wherein the neural network comprises a graph neural network.

Example 22: The computer-implemented method of Example 15, wherein using the features to search for or generate code snippets comprises using a lexical language model.

Example 23: The computer-implemented method of Example 15, wherein using the features to generate code snippets comprises using beam search.

Example 24: The computer-implemented method of Example 15, wherein the event is detecting that the programmer has finished typing.

Example 25: The computer-implemented method of Example 15, wherein each of the candidate code snippets includes a set of one or more associated keywords, the one or more associated keywords determined by analyzing one or more external codebases.

Example 26: The computer-implemented method of Example 15, wherein the selected candidate code snippet includes whitespace, and the whitespace is customized according to one or more inferred parameters from a codebase of the programmer.

Example 27: The computer-implemented method of Example 15, wherein the selected candidate code snippet includes whitespace, and the whitespace is customized according to one or more rules that are set in a development environment.

Example 28: A computer-implemented method comprising: receiving edits at a cursor location in a code editor from a programmer; updating source code at the cursor location in response to the edits received from the programmer; detecting an event to trigger code completion; receiving one or more keywords; determining features of the source code near the cursor location, wherein the features include one or more tokens near the cursor location; using the features and the one or more keywords to search for code snippets in a data set or to generate code snippets based on one or more models trained using the data set; identifying or generating one or more candidate code snippets, wherein the one or more candidate code snippets are multi-token code snippets; displaying the one or more candidate code snippets to the programmer; receiving a selection of one of the candidate code snippets; inputting the selected code snippet into the source code.

Example 29: The computer-implemented method of Example 28, further comprising: wherein the selected code snippet includes one or more blanks for filling in template variables and a user interface element is displayed for filling in the blanks, distinct from a normal text editing mode; receiving user input in the user interface element and filling in the blanks.

Example 30: The computer-implemented method of Example 28, further comprising: filling one of the blanks with a second code snippet, the second code snippet further including a second set of blanks for filling in a second set of template variables; displaying a second user interface element for filling in the second set of blanks, distinct from a normal text editing mode; receiving user input in the second user interface element for filling in the second set of blanks.

Example 31: The computer-implemented method of Example 28, further comprising: ranking the one or more candidate code snippets according to a score; wherein the score is based at least on a calculation of relevance.

Example 32: The computer-implemented method of Example 31, wherein the calculation of relevance is based at least in part on one or more features of tokens near the cursor location.

Example 33: The computer-implemented method of Example 28, wherein using the features to search for or generate code snippets comprises inputting the features into a neural network and receiving an output from the neural network.

Example 34: The computer-implemented method of Example 32, wherein the neural network comprises a graph neural network.

Example 35: The computer-implemented method of Example 28, wherein using the features to search for or generate code snippets comprises using a lexical language model.

Example 36: The computer-implemented method of Example 28, wherein using the features to generate code snippets comprises using beam search.

Example 37: The computer-implemented method of Example 28, wherein the selected candidate code snippet includes whitespace, and the whitespace is customized according to one or more inferred parameters from a codebase of the programmer.

Example 38: The computer-implemented method of Example 28, wherein the selected candidate code snippet includes whitespace, and the whitespace is customized according to one or more rules that are set in a development environment.

Example 39: A computer-implemented method comprising: receiving edits at a cursor location in a code editor from a programmer; updating source code at the cursor location in response to the edits received from the programmer; detecting an event to trigger code completion; determining features of the source code near the cursor location, wherein the features include one or more tokens near the cursor location; using the features to search for code snippets in a team or local data set or to generate code snippets based on one or more models trained using the team or local data set; identifying or generating one or more candidate code snippets; identifying or generating a natural language summary of each of the candidate code snippets; displaying the natural language summaries to the programmer; receiving a selection of one of the natural language summaries; identifying the code snippet that is associated with the selected natural language summary; inputting the associated code snippet.

Example 40: A computer-implemented method comprising: receiving edits at a cursor location in a code editor from a programmer; updating source code at the cursor location in response to the edits received from the programmer; detecting an event to trigger code completion; determining features of the source code near the cursor location, wherein the features include one or more tokens near the cursor location; using the features to search for code snippets in a team or local data set or to generate code snippets based on one or more models trained using the team or local data set; identifying or generating one or more candidate code snippets; identifying a common string between a subset of the one or more candidate code snippets and one or more portions of different text between candidate code snippets sharing a common string; displaying the common string to the programmer and displaying the one or more of the candidate code snippets as portions of different text indented below the common string; receiving a selection of one of the candidate code snippets; inputting the selected code snippet into the source code.

Example 41: A computer-implemented method comprising: training a machine learning system to detect the need for predictive edits; monitoring, by the machine learning system, source code edits from a user to determine if a code refactor is needed; detecting a change from the user that requires refactoring; determining, by the machine learning system, the one or more changes needed to refactor the source code; applying the refactor to the source code.

Example 42: A computer-implemented method comprising: training a machine learning system to detect a navigation and navigation location; monitoring actions performed in an editor by a user to determine when an action is performed that suggests navigation; detecting an action that suggests navigation; determining a new location to which the user should be navigated; suggesting a navigation to the new location to the user; receiving a selection from the user; performing the selected navigation.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
receiving edits at a cursor location in a code editor from a programmer;
updating source code at the cursor location in response to the edits received from the programmer;
detecting, with a code completion system, an event to trigger code completion;
determining features of the source code near the cursor location, wherein the features include one or more tokens near the cursor location;
using the features to search for code snippets in a team or local data set and to generate code snippets based on one or more models trained using the team or local data set;
identifying or generating one or more candidate code snippets;
predictively determining a selection of one of the candidate code snippets as a selected code snippet without user input or selection; and
automatically modifying, with the code completion system, and without user input or selection, the source code by inputting the selected code snippet into the source code,
wherein the one or more trained models further employ machine learning to identify actions that lead to a navigation, and learn the navigation to be performed to suggest the navigation to the programmer,
wherein the team or local data set is specific to prior code snippet selections made by a member of the team or an individual user on the team, and
wherein the team or local data set includes both positive and negative examples of the prior code snippet selections.

2. The computer-implemented method of claim 1, further comprising:
ranking the one or more candidate code snippets according to a score;
wherein the score is based at least on a calculation of relevance.

3. The computer-implemented method of claim 2, wherein the calculation of relevance is based at least in part on one or more features of tokens near the cursor location.

4. The computer-implemented method of claim 1, wherein using the features to search for or generate code snippets comprises inputting the features into a neural network and receiving an output from the neural network.

5. The computer-implemented method of claim 4, wherein the neural network comprises a graph neural network.

6. The computer-implemented method of claim 1, wherein using the features to search for or generate code snippets comprises using a lexical language model.

7. The computer-implemented method of claim 1, wherein using the features to generate code snippets comprises using beam search.

8. The computer-implemented method of claim 1, wherein the event is detecting that the programmer has finished typing.

9. The computer-implemented method of claim 1, wherein one or more of the candidate code snippets is a multi-token code snippet.

10. The computer-implemented method of claim 1, wherein each of the candidate code snippets includes a set of one or more associated keywords, the one or more associated keywords determined by analyzing one or more external codebases.

11. The computer-implemented method of claim 1, wherein the selected candidate code snippet includes whitespace, and the whitespace is customized according to one or more inferred parameters from a codebase of the programmer.

12. The computer-implemented method of claim 1, wherein the selected candidate code snippet includes whitespace, and the whitespace is customized according to one or more rules that are set in a development environment.

13. The computer-implemented method of claim 1, wherein predictively determining the selection of the one of the candidate code snippets as the selected code snippet comprises determining an estimated value of each of the candidate code snippets and choosing the selected code snippet based on the estimated value.

14. The computer-implemented method of claim 1, wherein predictively determining the selection of the one of the candidate code snippets as the selected code snippet comprises determining an estimated value of each of the candidate code snippets and automatically implementing the selected code snippet only if the estimated value of the selected code snippet is greater than a threshold.

15. A computer-implemented method comprising:
receiving edits at a cursor location in a code editor from a programmer;
updating source code at the cursor location in response to the edits received from the programmer;
detecting, with a code completion, an event to trigger code completion;
determining features of the source code near the cursor location, wherein the features include one or more tokens near the cursor location;
using the features to search for code snippets in a team or local data set and to generate code snippets based on one or more models trained using the team or local data set;
identifying or generating one or more candidate code snippets, wherein the one or more candidate code snippets are multi-token code snippets and the candidate code snippets contain content, the content of the candidate code snippets being adapted to a source code context at the cursor location;
predictively determining a selection of one of the candidate code snippets as a selected code snippet without user input or selection; and
automatically modifying, with the code completion system, and without user input or selection, the source code by inputting the selected code snippet into the source code,
wherein the one or more trained models further employ machine learning to identify actions that lead to a navigation, and learn the navigation to be performed to suggest the navigation to the programmer,
wherein the team or local data set is specific to prior code snippet selections made by a member of the team or an individual user on the team, and
wherein the team or local data set includes both positive and negative examples of the prior code snippet selections.

16. The computer-implemented method of claim 15, further comprising:
ranking the one or more candidate code snippets according to a score;
wherein the score is based at least on a calculation of relevance.

17. The computer-implemented method of claim 16, wherein the calculation of relevance is based at least in part on one or more features of tokens near the cursor location.

18. The computer-implemented method of claim 15, wherein using the features to search for or generate code snippets comprises inputting the features into a neural network and receiving an output from the neural network.

19. The computer-implemented method of claim 18, wherein the neural network comprises a graph neural network.

20. The computer-implemented method of claim 15, wherein using the features to search for or generate code snippets comprises using a lexical language model.

21. The computer-implemented method of claim 15, wherein using the features to generate code snippets comprises using beam search.

22. The computer-implemented method of claim 15, wherein the event is detecting that the programmer has finished typing.

23. The computer-implemented method of claim 15, wherein each of the candidate code snippets includes a set of one or more associated keywords, the one or more associated keywords determined by analyzing one or more external codebases.

24. The computer-implemented method of claim 15 wherein the selected candidate code snippet includes whitespace, and the whitespace is customized according to one or more inferred parameters from a codebase of the programmer.

25. The computer-implemented method of claim 15, wherein the selected candidate code snippet includes whitespace, and the whitespace is customized according to one or more rules that are set in a development environment.

26. The computer-implemented method of claim 15, wherein predictively determining the selection of the one of the candidate code snippets as the selected code snippet comprises determining an estimated value of each of the candidate code snippets and choosing the selected code snippet based on the estimated value.

27. The computer-implemented method of claim 15, wherein predictively determining the selection of the one of the candidate code snippets as the selected code snippet comprises determining an estimated value of each of the candidate code snippets and automatically implementing the selected code snippet only if the estimated value of the selected code snippet is greater than a threshold.

28. A computer-implemented method comprising:
receiving edits at a cursor location in a code editor from a programmer;
updating source code at the cursor location in response to the edits received from the programmer;
detecting, with a completion system, an event to trigger code completion;
receiving one or more keywords;
determining features of the source code near the cursor location, wherein the features include one or more tokens near the cursor location;
using the features and the one or more keywords to search for code snippets in a team or local data set and to generate code snippets based on one or more models trained using the team or local data set;
identifying or generating one or more candidate code snippets, wherein the one or more candidate code snippets are multi-token code snippets;
predictively determining a selection of one of the candidate code snippets as a selected code snippet without user input or selection; and automatically modifying, with the code completion system, and without user input or selection, the source code by inputting the selected code snippet into the source code, wherein the one or more trained models further employ machine learning to identify actions that lead to a navigation, and learn the navigation to be performed to suggest the navigation to the programmer, wherein the team or local data set is specific to prior code snippet selections made by a member of the team or an individual user on the team, and wherein the team or local data set includes both positive and negative examples of the prior code snippet selections.

29. The computer-implemented method of claim 28, further comprising:
ranking the one or more candidate code snippets according to a score;
wherein the score is based at least on a calculation of relevance.

30. The computer-implemented method of claim 29, wherein the calculation of relevance is based at least in part on one or more features of tokens near the cursor location.

31. The computer-implemented method of claim 28, wherein using the features to search for or generate code snippets comprises inputting the features into a neural network and receiving an output from the neural network.

32. The computer-implemented method of claim 30, wherein the neural network comprises a graph neural network.

33. The computer-implemented method of claim 28, wherein using the features to search for or generate code snippets comprises using a lexical language model.

34. The computer-implemented method of claim 28, wherein using the features to generate code snippets comprises using beam search.

35. The computer-implemented method of claim 28, wherein the selected candidate code snippet includes whitespace, and the whitespace is customized according to one or more inferred parameters from a codebase of the programmer.

36. The computer-implemented method of claim 28, wherein the selected candidate code snippet includes whitespace, and the whitespace is customized according to one or more rules that are set in a development environment.

37. The computer-implemented method of claim 28, wherein predictively determining the selection of the one of the candidate code snippets as the selected code snippet comprises determining an estimated value of each of the candidate code snippets and choosing the selected code snippet based on the estimated value.

38. The computer-implemented method of claim 28, wherein predictively determining the selection of the one of the candidate code snippets as the selected code snippet comprises determining an estimated value of each of the candidate code snippets and automatically implementing the selected code snippet only if the estimated value of the selected code snippet is greater than a threshold.

* * * * *